United States Patent [19]
Fukutani et al.

[11] Patent Number: 5,216,414
[45] Date of Patent: Jun. 1, 1993

[54] COLOR LIQUID CRYSTAL DISPLAY DEVICE

[75] Inventors: Hiroshi Fukutani, Nara; Kunihiko Ito, Yamatokooriyama; Mitsuaki Shioji; Kazuhiko Akimoto, both of Nara; Yasuhiro Inamasu, Ikoma; Toshihiro Matsumoto, Yamatokooriyama; Hiroshi Takanashi, Souraku, all of Japan

[73] Assignee: Sharp Kabushiki Kaisha, Osaka, Japan

[21] Appl. No.: 613,611

[22] Filed: Nov. 15, 1990

[30] Foreign Application Priority Data

| Nov. 20, 1989 | [JP] | Japan | 1-301270 |
| Jun. 20, 1990 | [JP] | Japan | 2-163923 |
| Aug. 9, 1990 | [JP] | Japan | 2-211798 |
| Aug. 9, 1990 | [JP] | Japan | 2-211799 |
| Aug. 9, 1990 | [JP] | Japan | 2-211800 |

[51] Int. Cl.$^5$ .............................. G09G 3/36
[52] U.S. Cl. .................... 340/784; 340/701; 340/793
[58] Field of Search ............ 340/701, 703, 716, 784, 340/793; 350/333, 334, 335, 336, 337; 359/54, 55, 64

[56] References Cited

U.S. PATENT DOCUMENTS

| 3,840,695 | 10/1974 | Fischer | 358/61 |
| 4,277,786 | 7/1981 | Waldron | 340/765 |
| 4,403,832 | 9/1983 | Tanaka et al. | 350/335 |
| 4,610,509 | 9/1986 | Sorimachi et al. | 340/702 |
| 4,632,514 | 12/1986 | Ogawa et al. | 350/339 F |
| 4,673,252 | 6/1987 | Kugo et al. | 350/339 |
| 4,712,877 | 12/1987 | Okada et al. | 340/793 |
| 4,791,417 | 12/1988 | Bobak | 340/784 |
| 4,920,409 | 4/1990 | Yamagishi | 358/56 |
| 4,927,240 | 5/1990 | Stolov et al. | 350/335 |

FOREIGN PATENT DOCUMENTS

| 60-260921 | 12/1985 | Japan . |
| 61-239220 | 10/1986 | Japan . |
| 62-91917 | 4/1987 | Japan . |

Primary Examiner—Jeffery A. Brier
Assistant Examiner—Jick Chin
Attorney, Agent, or Firm—David G. Conlin; George W. Neuner; Linda M. Buckley

[57] ABSTRACT

A color liquid crystal display device in which a color filter is provided over the entire surface of the glass substrate. In a first embodiment, display electrodes extend over a plurality of color filter sectors to form segment electrodes. In a second embodiment, the transmissivity of light passing through the liquid crystal layer can be varied in levels by making the display electrodes in two-layer, operating voltage on each of the electrodes independently, and varying in levels the amplitude of voltage applied on the liquid crystal layer by the display electrodes. In a third embodiment, the amount of light transmitted in the display area of a color filter sector is controlled by two or more display electrodes which divide up the display area.

2 Claims, 20 Drawing Sheets

Fig. 13 (1)
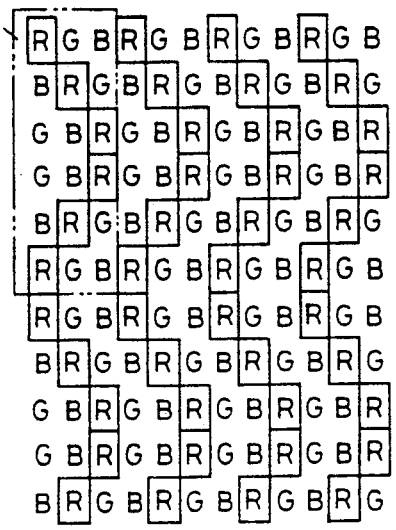
Fig. 13 (2)
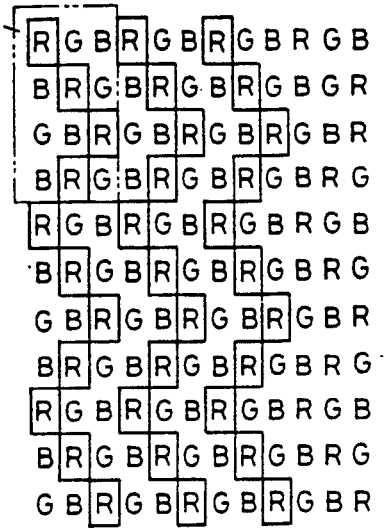
Fig. 13 (3)
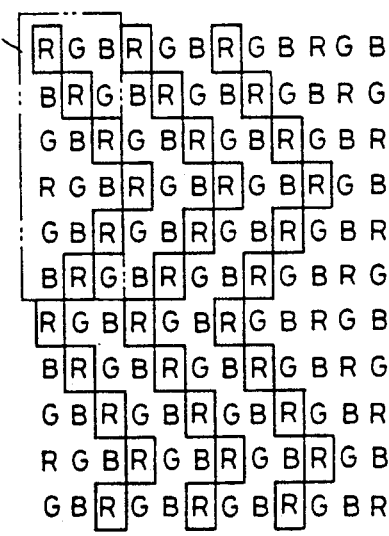
Fig. 14 (1)
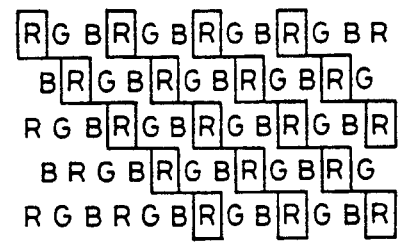
Fig. 14 (2)
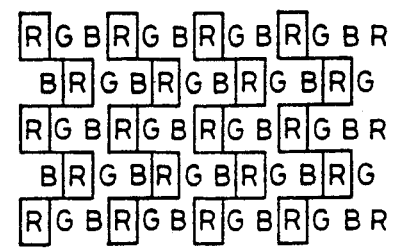

Fig. 31
(1) 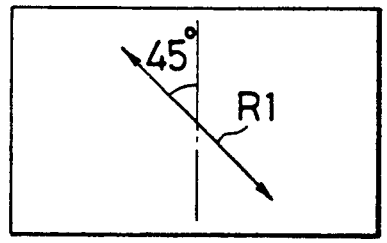
(2) 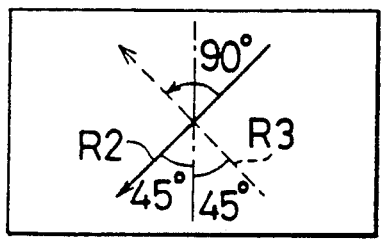
(3) 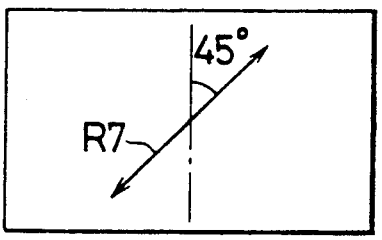
(4) 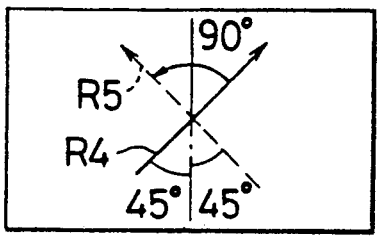
(5) 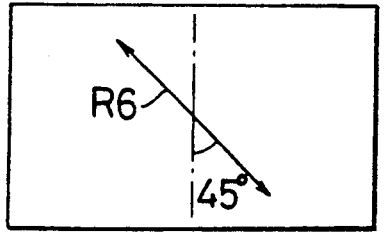

COLOR LIQUID CRYSTAL DISPLAY DEVICE

BACKGROUND OF THE INVENTION

1. Field of the Invention

The present invention relates to segment type color liquid crystal display devices which display prescribed characters, graphics, etc., in color.

2. Description of the Prior Art

FIG. 1 is a plane view of a segment type liquid crystal display device 230 of the prior art. A plurality of segment electrodes 233 is arranged in the liquid crystal display device in a figure eight. Area A1 has a color filter, colored red for example, area A2 has a green color filter and areas A3 to A5 have blue color filters.

FIG. 2 is a cross section of the liquid crystal display device 230. The liquid crystal layer 237 is sandwiched between the glass substrates 231a and 231b transmissive to light and sealed by the sealant resin 238. A plurality of segment electrodes 233 is formed on the surface of the glass substrate 231a toward the liquid crystal layer 237, and also formed on this surface is an orientation film 234a. A plurality of common electrodes 232 is formed on the surface of the glass substrate 231b toward the liquid crystal layer 237, and also formed on this surface is an orientation film 234b. Polarizer plates 235a and 235b are provided on the surfaces of the glass substrates 231a and 231b opposite the liquid crystal layer 237. The red, green and blue color filters 236 mentioned above are formed on areas of the polarizer plates 235a including the segment electrodes 233 by a printing process.

FIG. 3 is a cross section of another configuration of the liquid crystal display device 230. Here, the color filters 236 are formed above the common electrodes 232 by an electrodeposition process or a printing process in order to eliminate color shifts due to parallax in the display area.

In this kind of liquid crystal display device 230, a voltage is applied between the common electrode 232 and the electrodes corresponding to the display areas to be displayed from among the segment electrodes 233 in the area A1, whereby light is allowed to pass through the liquid crystal layer corresponding to the segment electrodes on which the voltage is applied and a red color is displayed. In the other areas, as well, the same method is used to display green and blue.

In the liquid crystal display device disclosed in U.S. Pat. No. 3,840,695, color filters are disposed on the front and rear surfaces of the liquid crystal display element so only one color can be displayed in a single unit area.

Generally, liquid crystals are dependent on the light wavelength, so the blockage of light in the liquid crystal display device is not complete; i.e., light cannot be blocked over the entire visible wavelength band. Therefore when performing positive display (black display color on a white background) in the liquid crystal display device 230, light passes through the liquid crystal layer 237 even when voltage is not applied on the liquid crystal layer 237, so the area A1 colored red in FIG. 1 can be distinguished from the other areas, thus degrading the display quality of the liquid crystal display device 230. Also, in the case of negative display (white display color on a black background), the blockage of light by the liquid crystal layer 237 is not complete, so when voltage is not being applied, the shape of the color filters 236 can be seen, thus degrading the display quality.

Further, since the display colors of the display areas are determined by the colors of the color filters at the process of production of the liquid crystal display device, the same display area cannot display different colors, thus detracting from the diversity of display and applicability.

Liquid crystal display devices utilizing fine stripe-shaped color filters were disclosed in Japanese Laid-Open Patent Publications 60-260921, 61-239220 and 62-091917 to solve the above problems.

FIG. 4 is a cross section of a segment type color liquid crystal display device 301 utilizing stripe-shaped color filters. A color filter 305 is provided on nearly the entire surface of one surface of the glass substrate 304a, which is transmissive to light, by means of a printing process or an electrodeposition color process, and a plurality of segment electrodes 306 is formed on the color filter 30 corresponding to predetermined display areas. The color filter 305 is formed in a stripe shape parallel to the surface of the paper in FIG. 4 and a plurality of red, green and blue filters is arranged in a predetermined order in a direction perpendicular to the surface of the paper in FIG. 4. The segment electrodes 306 comprise an electrode for red, an electrode for green and an electrode for blue corresponding to the red filter, green filter and blue filter.

On one surface of the glass substrate 304b transmissive to light is formed a plurality of common electrodes 308 over the areas containing the display areas corresponding to the segment electrodes 306, and then an orientation film 307b is formed on the surface. The glass substrates 304a and 304b are disposed so that the surfaces face each other on which the orientation films 307a and 307b are formed, and a twisted nematic liquid crystal layer 309 is sandwiched between the glass substrates 304a and 304b and sealed with a sealant resin 310. The surfaces of the glass substrates 304a and 304b opposite the liquid crystal layer 309 are each provided with polarizer plates 311 and 312.

Here, the polarizer plates 311 and 312 are disposed to achieve parallel polarization, and so-called "normally black" display is performed; i.e., light is not allowed to pass through the liquid crystal display when voltage is not applied. By applying a voltage on one of the three electrodes which make up the segment electrodes 306, the desired color can be displayed at the display area corresponding to the segment electrodes 306. For example, when a voltage is applied on only the electrode for red, red is displayed in the display area, and when voltages are simultaneously applied on the electrode for red and the electrode for green, yellow can be displayed by the mixing of the red and green colors. Further, when voltages are simultaneously applied on the electrode for red, the electrode for green and the electrode for blue, white can be displayed.

The color liquid crystal display device 301 described above is provided with transparent electrodes corresponding to each of the three color filters; e.g., red filter, green filter and blue filter, formed in the predetermined display area, and by selecting the transparent electrode(s) on which the operating voltage is to be applied, a maximum of eight colors can be displayed.

However, since each of the display colors can only be displayed at one gradation level, there is a limit to the variety of display colors, so the display lacks diversity.

A color liquid crystal display device can be conceived which realizes display of gray scale levels of color (variable density) wherein the light transmissivity of the liquid crystal layer is changed and gray scale display performed by using a drive circuit capable of controlling the amplitude of operating voltage applied or the time of operating voltage is applied on the liquid crystal layer. In this color liquid crystal display device, it is necessary to develop a drive circuit for controlling the amplitude of operating voltage or the time of the operating voltage.

Further, a color liquid crystal display device has been proposed which achieves gray scale display by varying the area on the transparent electrode on which voltage is applied by dividing the transparent electrodes, which are formed so they correspond to the color filters, up into a greater number and driving the divided electrodes independently FIG. 5 is a cross section showing the configuration of a color liquid crystal display device 101 capable of gray scale display. The color liquid crystal display device 101 comprises a pair of transparent substrates 102a and 102b, and segment electrodes 100 are formed on one side of the transparent substrate 102a in the area corresponding to the shape to be displayed. The segment electrodes 100 are made up of the electrodes 100R, 100G and 100B corresponding to the three color filters 105R, 105G and 105B. The electrodes 100R, 100G and 100B are each made up of the first and second segment electrodes 103R and 104R, 103G and 104G, and 103B and 104B.

The color filter 105 is formed on the transparent substrate 102a on which the segment electrodes 100 are formed. The color filter 105 comprises color filters of three colors; e.g., the red filter 105R, the green filter 105G and the blue filter 105B, formed in a stripe shape and a black light mask layer 105BL disposed between each of the filters, and it is formed over nearly the entire surface of one side of the transparent substrate 102a by a printing process or other process. The orientation film 106 is then formed on the surface of the color filter 105.

The common electrode 107 is formed on one surface of the transparent substrate 102b in an area containing at least the segment electrodes 100, and then an orientation film 106b is formed on that surface.

The transparent substrates 102a and 102b are disposed so that their respective surfaces on which the orientation films 106a and 106b are formed oppose each other, and the liquid crystal layer 108 is sandwiched between the transparent substrates 102a and 102b and sealed by the sealant 109. The polarizer plates 110 and 111 are disposed on the surfaces of the transparent substrates 102a and 102b opposite the liquid crystal layer 108.

When producing the color liquid crystal display device 101, the electrodes corresponding to the fine color filters are further divided, so high precision processing technology is required and productivity is low. Further, the first and second segment electrodes 103 and 104 are formed on the same flat surface; i.e., on the transparent substrate 102a, so it is necessary to leave a fixed interval between adjacent electrodes when they were formed in order to electrically isolate (insulate) them, thus resulting in reduced illumination ratio (illuminated area/display area $\times 100(\%)$). When the interval between the first and second segment electrodes 103 and 104 was formed as narrow as possible in order to improve illumination ratio, short circuits between electrodes and broken wires often occurred, so in practice they were impossible to produce.

The display image of the segment type color liquid crystal display devices 230 and 301 is determined by the shape of the segment electrodes 233 and 306 and cannot be changed subsequent to production of the color liquid crystal display devices 230 and 301, so these devices lack in diversity of display.

In order to enhance the diversity of display, a color liquid crystal display device was proposed in which a liquid crystal element for color display and a liquid crystal element for black and white display were stacked.

FIG. 6 is a cross section of the two-layered liquid crystal display device 401. The liquid crystal display device 401 comprises two liquid crystal elements for display: the liquid crystal element 402 for color display and the liquid crystal element 403 for black and white display.

The liquid crystal element 402 for color display comprises a pair of transparent substrates 404a and 404b. A plurality of segment electrodes 405 transmissive to light are formed on one surface of the transparent substrate 404a, and the color filter 406 is formed on the transparent substrate 404a on which the segment electrodes 405 were formed. The color filter 406 has the same configuration as the color filter 305 in FIG. 4. The orientation film 407a is formed on the surface of the color filter 406.

The light transmissive common electrodes 408 are formed in an area on one surface of the transparent substrate 404b containing at least the segment electrodes 405, and then an orientation film 407b is formed on that surface. The transparent substrates 404a and 404b are disposed so that their respective surfaces on which the orientation films 407a and 407b are formed oppose each other. The liquid crystal layer 409 is sandwiched between the transparent substrates 404a and 404b and sealed with the sealant 410.

The liquid crystal element 403 for black and white display comprises a pair of transparent substrates 411a and 411b, a plurality of segment electrodes 412 formed on one surface of the transparent substrate 411a in a range corresponding to the predetermined shape to be displayed in the display area, and an orientation film 413a formed on the transparent substrate 411a on which the segment electrodes 412 are formed. The common electrodes 414 transmissive to light are formed in an area on one surface of the transparent substrate 411b containing at least the segment electrodes 412, and then the orientation film 413b is formed on the transparent substrate 411b on which the common electrodes 414 were formed. The transparent substrates 411a and 411b are disposed so that their respective surfaces on which the orientation films 413a and 413b are formed oppose each other. The liquid crystal layer 415 is sandwiched between the transparent substrates 411a and 411b and sealed with the sealant 416.

The liquid crystal element 402 for color display and the liquid crystal element 403 for black and white display are stacked together so that the transparent substrate 404a and the transparent substrate 411b face each other. The polarizer plate 417 is disposed on the surface of the transparent substrate 404b opposite the liquid crystal layer 409, and the polarizer plate 418 is disposed on the surface of the transparent substrate 411a opposite the liquid crystal layer 415. These polarizer plates 417 and 418 are also disposed so that they are parallel polarization.

The angle of twist of the molecules of both the liquid crystal layer 409 of the liquid crystal element 402 for color display and the liquid crystal layer 415 of the liquid crystal element 403 for black and white display is 90°. Also, the molecules of the liquid crystal layer 409 have a levorotatory orientation, while the molecules of the liquid crystal layer 415 have a dextrorotatory orientation. That is, the directions of spiral of the molecules in the two liquid crystal elements 402 and 403 are set so they are opposite each other. Further, the direction of orientation of the liquid crystal molecules nearest the transparent substrate 404a in the liquid crystal layer 409 and the direction of orientation of the liquid crystal molecules nearest the transparent substrate 411b in the liquid crystal layer 415 are set so they are perpendicular to each other.

FIG. 7 is a plane view of the liquid crystal display device 401. The display area A6 is the area formed by the segment electrodes 405 of the liquid crystal element 402 for color display and it is capable of color display. The display area A7 is the area formed by the segment electrodes 412 of the liquid crystal element 403 for black and white display, and it is capable of black and white display. Here, the polarizer plates 417 and 418 are disposed so they are parallel polarization. Therefore, when voltage is not applied on the liquid crystal layer, the incident light passes through the liquid crystal layer, thus facilitating so-called "normally white display" in which the background color is white.

TABLE 1 shows the relationship between the operating condition of the liquid crystal element 402 for color display and the liquid crystal element 403 for black and white display in each of the display areas in the liquid crystal display device 401, the direction of polarization of the incident light on and the light passing through the liquid crystal element 402 for color display and the liquid crystal element 403 for black and white display, and the color displayed in the display area. Here, the direction of the polarizer plates 417, 418 is parallel to the surface of the paper in FIG. 6.

TABLE 1

| Display area | Element for color display | | Transmitted light | Element for black & white display | Transmitted light | Transmitted/blocked | Color |
| --- | --- | --- | --- | --- | --- | --- | --- |
| A6 | R | OFF | Perpendicular | OFF | Parallel | Transmitted | Red |
| | G | ON | Parallel | | Perpendicular | Blocked | |
| | B | ON | Parallel | | Perpendicular | Blocked | |
| A7 | R | OFF | Perpendicular | ON | Perpendicular | Blocked | Black |
| | G | OFF | Perpendicular | | Perpendicular | Blocked | |
| | B | OFF | Perpendicular | | Perpendicular | Blocked | |
| A8 | R | OFF | Perpendicular | ON | Perpendicular | Blocked | Light blue |
| | G | ON | Parallel | | Parallel | Transmitted | |
| | B | ON | Parallel | | Parallel | Transmitted | |
| Residual | R | OFF | Perpendicular | OFF | Parallel | Transmitted | White |
| | G | OFF | Perpendicular | | Parallel | Transmitted | |
| | B | OFF | Perpendicular | | Parallel | Transmitted | |

As shown in TABLE 1 above, in the case in which red is displayed in the display area A6 and black is displayed in the display area A7, light blue is displayed in the display area A8 where the display area A6 and the display area A7 overlap.

SUMMARY OF THE INVENTION

The purpose of this invention is to provide a color liquid crystal display device capable of performing gradation levels of display.

Another purpose of this invention is to provide a color liquid crystal display device with greatly improved diversity in display and color display quality.

This invention is a color liquid crystal display device comprising a pair of light-transmissive substrates with a liquid crystal layer between them, a plurality of light selection members disposed over the entire surface of one side in the direction of thickness of the light-transmissive substrates and which select a color for the transmitted light from among a plurality of predetermined colors, and light-transmissive display electrodes disposed in the display area of the light-transmissive substrate on the side toward the liquid crystal layer and formed within a range corresponding to the plurality of color selection members selected according to the predetermined color to be displayed in the display area.

Further, the color selection members in this invention are square shaped and arranged in a mosaic, and the display electrodes corresponding to the color selection members which select the same color are connected in sequence.

According to this invention, a plurality of light selection members which select a color for the transmitted light from among a plurality of predetermined colors is provided over the entire surface of one side in the direction of thickness of a pair of light-transmissive substrates with a liquid crystal layer between them, and light-transmissive display electrodes are provided in the display are of the light-transmissive substrates on the side toward the liquid crystal layer and are formed within a range corresponding to the plurality of color selection members selected according to the predetermined color to be displayed in the display area.

Further, the color selection members are square shaped and arranged in a mosaic, and the display electrodes corresponding to the color selection members which select the same color are connected in sequence.

Therefore, the display electrodes are formed corresponding to one type of color selection member, and by applying a voltage on these display electrodes, light is able to pass through the liquid crystal layer. One predetermined color is selected for this transmitted light, and by this means, the predetermined color is displayed in the display area. A greater variety of colors can be displayed in the display area by separately forming display electrodes corresponding to the plurality of color selection members and combining a plurality of colors selected by the color selection members.

Also, since the color selection members are provided over the entire surface of the light-transmissive substrates, the entire surface of the color liquid crystal display device is the same color; that is, the color resulting from the combination of colors selected by each of the color selection members, so even though light may leak through the liquid crystal layer when a voltage is not being applied on the display electrodes, no part will appear as a different color and display quality is improved.

Further, since the color selection members are arranged in a mosaic, when multiple colors are combined, the mixing of the colors being viewed is greatly improved.

As described above, by means of this invention, a plurality of color selection members is provided over the entire surface of the light-transmissive substrate, so desired colors can be displayed in the display area by forming the display electrodes formed in the display area so they correspond to the desired color selection members. That is, by providing separate display electrodes corresponding to the plurality of color selection members, multiple colors can be combined, and by this means, colors different from the predetermined colors selected by the color selection members can be displayed in the display area.

Also, since the color selection members are provided over the entire surface of the light-transmissive substrate, even though there may be light leakage in areas other than the display area where voltage is applied, the area other than the display area is the color resulting from the combination of the colors selected by each of the color selection members, so coloration of only specific areas as in the prior art is prevented and display quality is improved.

Further, since the color selection members are arranged in a mosaic, when multiple colors are combined, the mixing of the colors being viewed is greatly improved.

This invention is a color liquid crystal display device comprising a pair of light-transmissive substrates with a liquid crystal layer between them, plurality of light selection members provided over the entire surface of the side of the light-transmissive substrate toward the liquid crystal layer and which select a color for the transmitted light from among a plurality of predetermined colors, and light-transmissive display electrodes provided on the side of the light-transmissive substrate toward the liquid crystal layer and formed for each of the plurality of color selection members in the display area; whereby the amplitude of the voltage applied on the liquid crystal layer by the display electrodes by making the display electrodes in two-layer and operating voltage on each of the electrodes independently.

According to this invention, normally black display in which the background color is black can be performed by not passing light through the color liquid crystal display device while voltage is not applied. Here, the display electrodes are formed according to a predetermined shape, and light can be passed through the liquid crystal layer by operating a voltage on these display electrodes formed so they conform to the color selection members of the desired color. One predetermined color is selected for this transmitted light by the color selection members, and by this means, a predetermined shape corresponding to the display electrodes is displayed on the color liquid crystal display device in a predetermined color.

At this time, different colors can be displayed by operating a voltage on the display electrodes formed separately so they correspond to a plurality of color selection members combining multiple colors selected by the color selection members.

Further, since color selection members are provided over the entire surface of the light-transmissive substrate, the same color; i.e., the color resulting from the combination of the colors selected by each of the color selection members, is displayed over the entire surface of the color liquid crystal display device should any light leak through the liquid crystal layer while voltage is not being applied on the display electrodes, so the display of only one part in a different color is prevented and display quality is improved.

In the normally black display described above, light is passed through the liquid crystal layer by operating a voltage greater than the predetermined threshold voltage for the liquid crystal layer. It is known that increasing the amount of voltage applied on the liquid crystal layer will increase the transmissivity of the light passing through the liquid crystal layer. In this invention, the transmissivity of light passing through the liquid crystal layer can be varied in levels by making the display electrodes in two-layer, operating voltage on each of the electrodes independently, and varying in levels the amplitude of voltage applied on the liquid crystal layer by the display electrodes. Therefore, the same color can be displayed in gray scales of brightness by increasing the transmissivity or gray scales of darkness by lowering the transmissivity. In this manner, the same color can be displayed in varying gray scales, thus increasing the variety of display colors and improving the diversity of display.

As described above, by means of this invention, the same display area can be displayed in different colors and different gray scales, thus improving the diversity of display.

This invention is a color liquid crystal display device comprising a pair of light transmissive substrates with a liquid crystal layer between them, a plurality of color selection members provided over the entire surface of the light transmissive substrate toward the liquid crystal layer and which select one color for the transmitted light from among a plurality of predetermined colors, and light transmissive display electrodes provided on the side of the transparent substrate toward the liquid crystal layer and formed for each of the plurality of color selection members in the predetermined display area, wherein the area on which voltage is applied on the display electrodes is varied by dividing the display electrodes into a multiple of electrodes and operating voltage on each of the electrodes independently.

According to this invention, normally black display in which the background color is black can be performed by not allowing light to pas through the color liquid crystal display device when voltage is not applied. Here, the display electrodes are formed according to a predetermined shape, and light can be passed through the liquid crystal display device by operating a voltage on the display electrodes formed so they conform to the color selection members of the desired color. One predetermined color is selected for this transmitted light by the color selection members, and by this means, the predetermined shape corresponding to the display electrodes is displayed on the liquid crystal display device in the predetermined color.

At this time, different colors can be displayed by operating a voltage on the display electrodes formed separately so they correspond to the plurality of color selection members and combining multiple colors selected by the color selection members.

Since the color selection members are provided over the entire surface of the light transmissive substrate, the same color; i.e, the color resulting from the combination of the colors selected by the color selection members, is displayed over the entire surface of the color liquid crystal display device even when light leaks through the liquid crystal layer when voltage is not being applied on the display electrodes, so the display of any single part in a different color is prevented and display quality is improved.

In normally black display, light is passed through the liquid crystal layer by applying a voltage greater than the threshold voltage prescribed for the liquid crystal layer. In this invention, the amount of light transmitted in the display area can be varied by varying the area on which voltage is applied on the display electrodes. Therefore, the same color can be displayed in levels of brightness by increasing the amount of transmitted light and in levels of darkness by decreasing the amount of transmitted light. In this manner, the same color can be displayed in a plurality of levels, thus increasing the variety of display colors and improving the diversity of display.

By means of the above invention, light is passed through the liquid crystal layer in normally black display by applying a voltage greater than the threshold voltage prescribed for the liquid crystal layer. In this invention, the amount of light transmitted in the display area can be varied in stages by changing the area in stages on which voltage is applied on the display electrodes. Therefore, the same color can be displayed in levels of brightness by increasing the amount of transmitted light and in levels of darkness by decreasing the amount of transmitted light. In this manner, the same color can be displayed in a plurality of levels, thus increasing the variety of display colors and improving the diversity of display.

This invention is a color liquid crystal display device in which first and second liquid crystal elements are stacked, respectively, on a pair of light transmissive substrates, wherein first liquid crystal element comprises, plurality of color selection members provided over the entire surface of one side in the direction of thickness of the light transmissive substrate and which select a color for the transmitted light from among a plurality of predetermined colors; and first display electrodes provided in the first predetermined display area of the light transmissive substrate on the side toward the liquid crystal layer and formed for each of the plurality of color selection members, second liquid crystal display element comprises second display electrodes formed in the range corresponding to the predetermined shape to be displayed in the second predetermined display area, wherein the first polarizer plate with a predetermined direction of polarization is disposed o the side of the first liquid crystal element opposite the second liquid crystal element, second polarizer plate with the same direction of polarization as the first polarizer plate is disposed on the side of the second liquid crystal element opposite the first liquid crystal element, third polarizer plate whose direction of polarization is perpendicular to the above-mentioned predetermined direction of polarization and is disposed between the first and second liquid crystal elements.

In the color liquid crystal display device of this invention, the first polarizer plate, the first liquid crystal element, the third polarizer plate, the second liquid crystal element and the second polarizer plate are stacked in that order. Here, the direction of polarization of the third polarizer plate is perpendicular to the direction of polarization of the first and second polarizer plates. Therefore, when voltage is not applied on the liquid crystal layer, the direction of polarization of the incident light which passes through the first polarizer plate and becomes linearly polarized light is twisted 90°, for example, so it passes through the third polarizer plate. The direction of polarization of this transmitted light is further twisted 90° by the second liquid crystal element, so it passes through the second polarizer plate. Here, should the color selection members select the colors red, green and blue, for example, then white is displayed on the color liquid crystal display device due to the mixing of the colors red, green and blue.

When voltage is applied on the first display electrodes of the first liquid crystal element, the incident light is made linearly polarized light by the first polarizer plate, but since the liquid crystal layer on which the voltage is applied loses its rotatory polarization, the linearly polarized light passes through the first liquid crystal element in its polarized state. Since the direction of polarization of the third polarizer plate is perpendicular to the direction of polarization of the first polarizer plate, the light transmitted by the first liquid crystal element cannot pass through the third polarizer plate. Therefore, by operating voltage on first display electrodes corresponding to the color selection members which select the colors green and blue, for example, the green light and blue light are blocked, and red is displayed on the color liquid crystal display device.

Next, when voltage is applied on the liquid crystal layer of the second liquid crystal element, the incident light passes through the first polarizer plate and becomes linearly polarized light and its direction of polarization is twisted 90° by the first liquid crystal element, so it passes through the third polarizer plate. When voltage is applied on the second liquid crystal element, the liquid crystal layer loses its rotatory polarization, so the transmitted light passes through the second liquid crystal element in its polarized state. Therefore, the light transmitted by the second liquid crystal element cannot pass through the second polarizer plate whose direction of polarization is perpendicular to that of the third polarizer plate, and so the shape corresponding to the second display electrode is displayed in black on the color liquid crystal display device.

In this manner, color display and black and white display can be performed separately or together in one color liquid crystal display device, thus improving diversity of display. Further, by disposing a third polarizer plate between the first and second liquid crystal elements, the linearly polarized light transmitted by the liquid crystal layer when voltage is applied on the first liquid crystal element is blocked by the third polarizer plate and does not reach the second liquid crystal element. Therefore, the display color is prevented from becoming a complementary color even in the area where the area in which the first display electrodes are formed and the area in which the second display electrodes are formed overlap, thus improving display quality.

By means of the above invention, color display and black and white display can be performed by separately driving the first and second liquid crystal elements. At this time, even should the color display image and the black and white display image overlap, the color of the color display image in the overlapping area is prevented from becoming a complementary color as in the prior art and isolation of the color display and black and white display is maintained. By this means, the display quality of the color liquid crystal display device is greatly improved.

BRIEF DESCRIPTION OF THE DRAWINGS

FIGS. 13(1), 13(2) and 13(3) show the order of arrangements of the color filters R, G and B and the sequence of connection of the segment electrodes;

FIGS. 14(1) and 14(2) show another order of arrangements for the color filters R, G and B and sequence of connection for the segment electrodes;

FIG. 31 shows the correlation between the direction of polarization of the polarizer plates 87, 88 and 89 and the direction of orientation of the liquid crystal molecules in the liquid crystal layers 79 and 85 in the color liquid crystal display device 71.

EMBODIMENT 1

Figure 1:
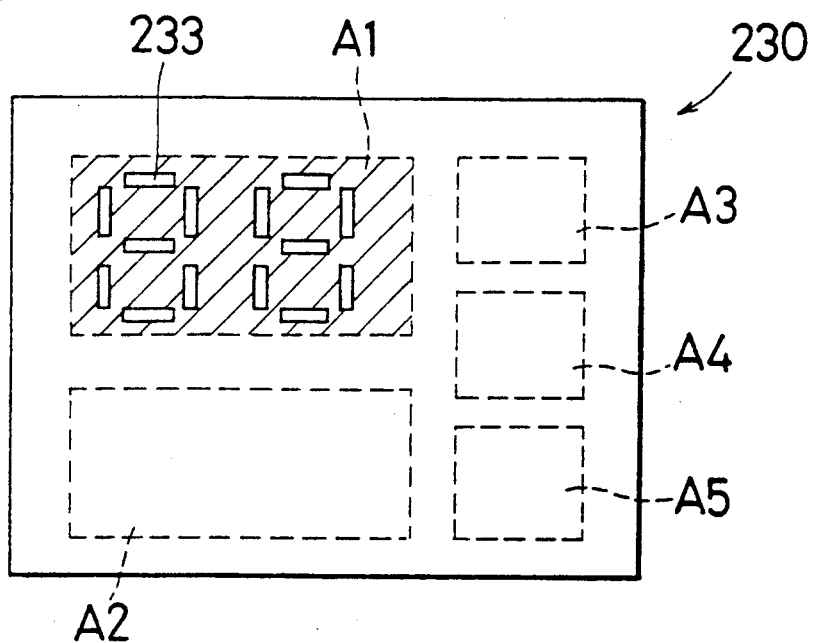
FIG. 1 is a plane view of the liquid crystal display device 230 of the prior art.
Figure 2:
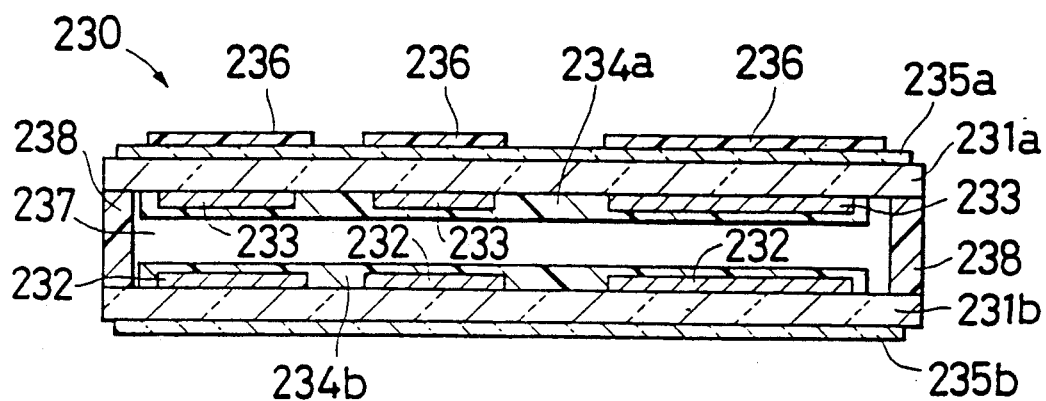
FIG. 2 and FIG. 3 are cross sections of the liquid crystal display device 230 of the prior art.
Figure 3:
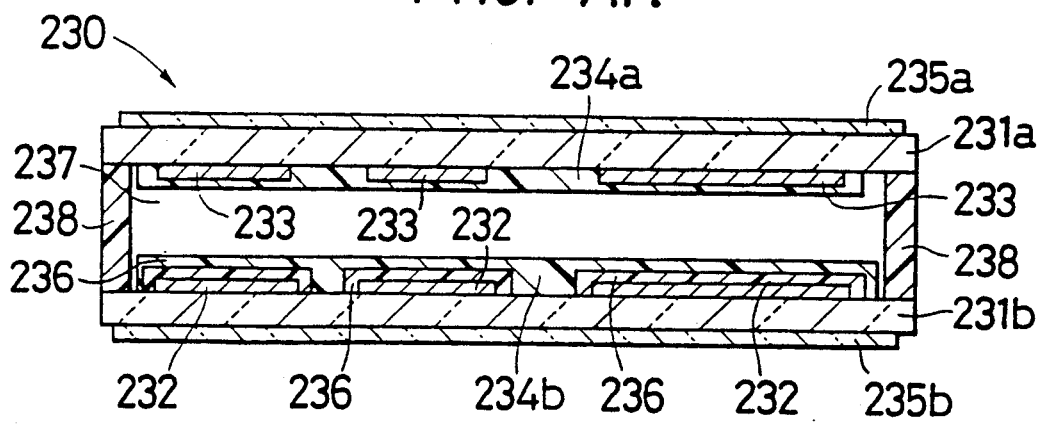
Figure 4:
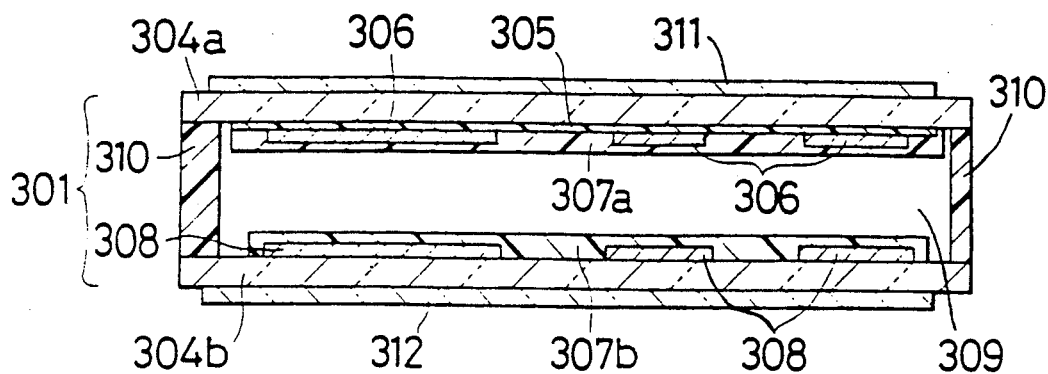
FIG. 4 is a cross section of the liquid crystal display device 301 of the prior art.
Figure 5:
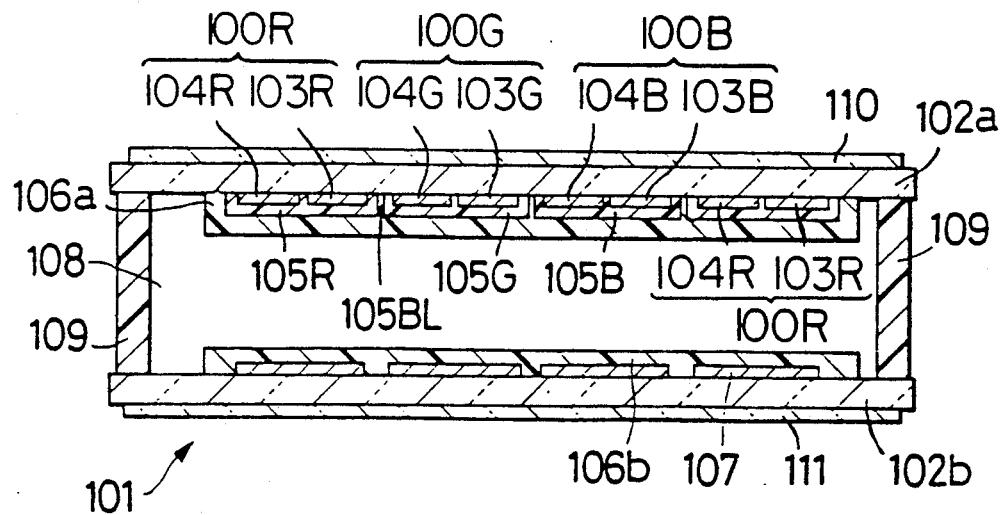
FIG. 5 is a cross section showing the configuration of the color liquid crystal display device 101 of the prior art.
Figure 6:
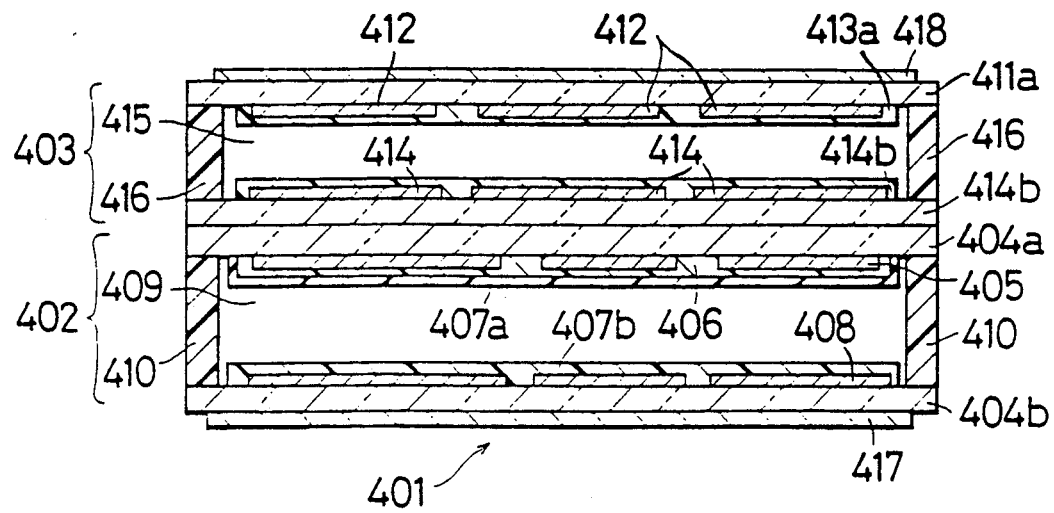
FIG. 6 is a cross section showing the configuration of the two-layer type color liquid crystal display device 401 of the prior art.
Figure 7:
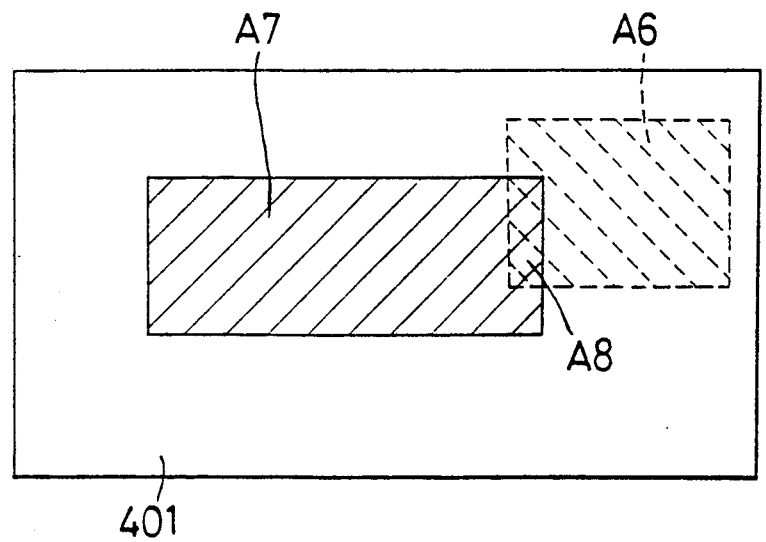
FIG. 7 is a plane view of the color liquid crystal display device 401.
Figure 8:
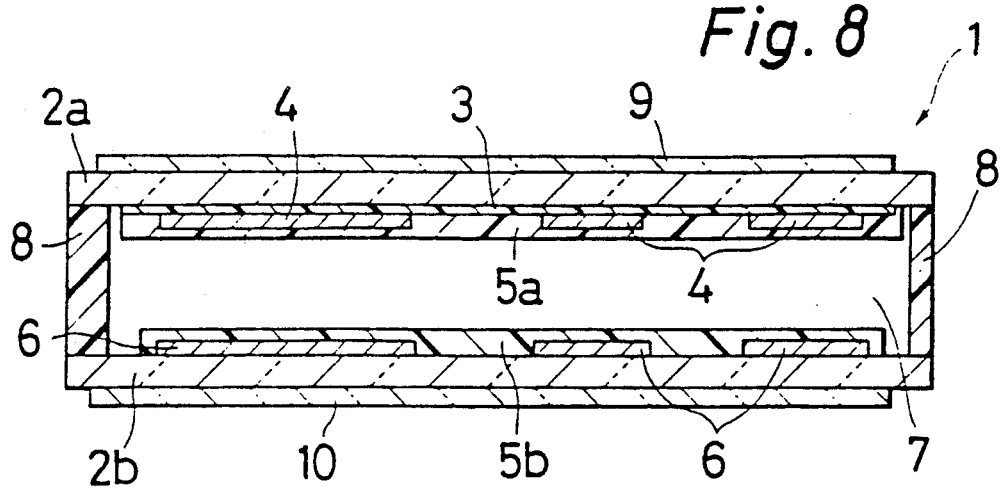
FIG. 8 is a cross section of the liquid crystal display device 1 which is a first embodiment of this invention.

FIG. 8 is a cross section of a liquid crystal display device 1 which is a first embodiment of the invention. The liquid crystal layer 7 is sandwiched between the light-transmissive glass substrates 2a and 2b and sealed with the sealant resin 8. A thickness between 4 micron and 30 micron is selected for the liquid crystal layer 7, but it is normally between 5 micron and 10 micron. Twisted nematic (TN) liquid crystal or super twisted nematic (STN) liquid crystal is used as the liquid crystal.

A color filter 3 described below is formed over nearly the entire surface of the glass substrate 2a toward the liquid crystal layer 7 by a printing process or an electro-deposition process, and a plurality of segment electrodes 4 is formed on the color filter 3. The color filter 3 can be formed on either the inside or the outside (e.g., on polarizing plates 9 and 10 described below) of the liquid crystal display device 1, but it is preferable to form it on the inside in order to prevent a shift in color due to parallax in the display area. Further, the orientation film 5a is formed on the segment electrodes 4.

A plurality of common electrodes 6 is formed on the side of the glass substrate 2b toward the liquid crystal layer 7 over the area containing the display area corresponding to the segment electrodes 4, and an orientation film 5b is formed on top of that. The polarizing plates 9 and 10 are formed on the respective surfaces of the glass substrates 2a and 2b opposite the liquid crystal layer 7.

In FIG. 8, the color filter 3 is positioned between the glass substrate 2a and the segment electrodes 4, but the color filter 3 can also be positioned between the glass substrate 2b and the common electrodes 6.

The color filter 3 can also be positioned between the segment electrodes 4 and the orientation film 5a, or between common electrodes 6 and the orientation film 5b.

Figure 9:
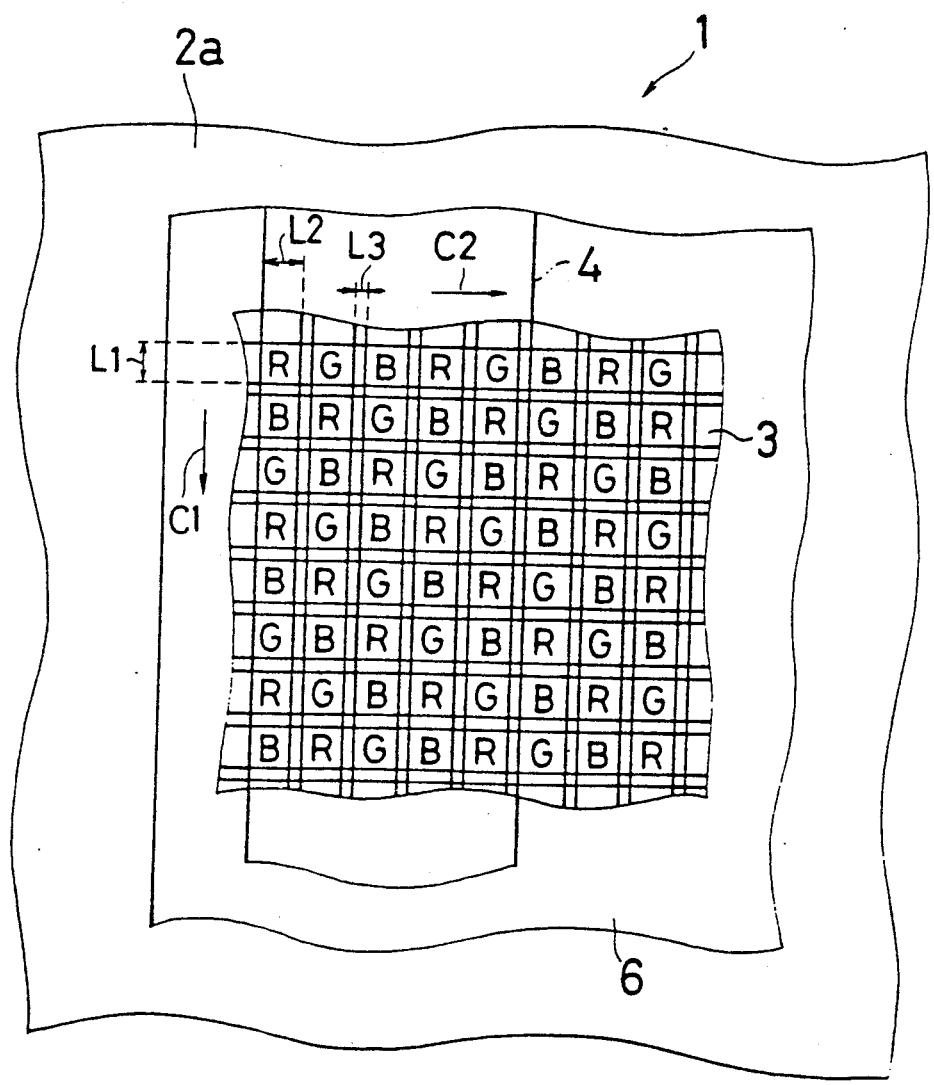
FIG. 9 is an enlarged plane view of the liquid crystal display device 1.
Figure 10:
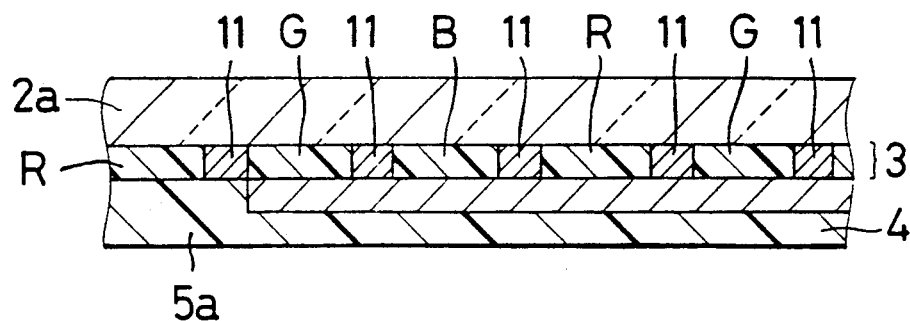
FIG. 10 is an enlarged cross section of the area around the color filter 3.

FIG. 9 is a plane view of a liquid crystal display device 1 which is an embodiment of this invention, and FIG. 10 is an enlarged cross section of the area around the color filter 3. In the liquid crystal display device 1, the color filter 3, which is the color selection member, is provided over the entire surface of the glass substrate 2a. The color filter 3 is formed from red, green and blue filters arranged in a matrix or mosaic.

In FIG. 9, the red filter is indicated by the reference code R, the green filter by the reference code G, and the blue filter by the reference code B. The filters R, G, and B are small enough in size to be indistinguishable by the naked eye.

As an example, rectangular filters R, G and B are used whose length L1 is 330 micron and width L2 is 80 micron, and the interval L3 between filters is set at 30 micron. Therefore, the area formed by the three filters R, G and B lined up in the direction of the width C2 of the filter is a square 330 micron × 330 micron.

The interval L3 between filters is determined by the precision of the photoprocess and other processes used to produce the color filters, but it is generally 15 micron to 40 micron.

The filters are arranged in a repeating R-G-B sequence in the direction of the width C2 and a repeating R-B-G sequence in the direction of the length C1 of the filter. The filters R, G and B can be square or other shape. Further, a black light mask 11 is formed between each of the filters R, G and B. The light mask 11 is made from chrome or a black pigment.

Figure 11:
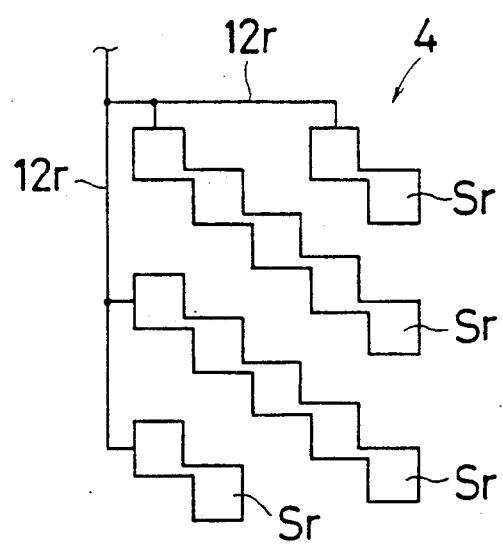
FIGS. 11(1) and 11(2) are plane views of the segment electrode 4.
Figure 11:
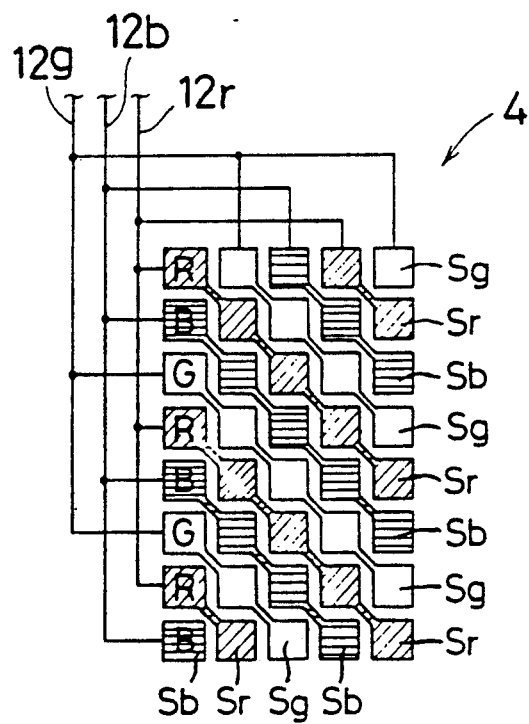

FIG. 11 is an enlarged plane view of the segment electrodes 4. In one embodiment, the segment electrodes 4 are formed only in the areas corresponding to the red filters R of the color filter 3 in the display area as shown in FIG. 11 (1), and each segment electrode Sr is connected by the transparent electrode 12r which functions as a signal line.

In FIG. 11 (1), an example is shown in which the segment electrodes Sr formed in the areas corresponding to the red filters R are electrically connected by the transparent electrode 12r, but a plurality of red, green and blue quadrilateral color filters R, G and B are arranged on the glass substrate 2a in a matrix or mosaic, and this invention is a color liquid crystal display device in which transparent electrodes are disposed so they sequentially connect segment electrodes corresponding to color filters of the same color.

This example is shown in FIG. 11 (2). In FIG. 11 (2), the segment electrodes Sr, Sb and Sg are formed in the respective areas corresponding to the red filters r, blue filters B and green filters G of the color filter 3 in the display area, and each of the segment electrodes Sr, Sb and Sg are connected by the transparent electrodes 12r, 12b and 12g which function as signal lines. By using this connection method and selecting desired segment electrodes on which voltage is to be applied, the seven colors red, yellow, green, dark green, blue, white and purple can be displayed in the target display area.

Figure 12:
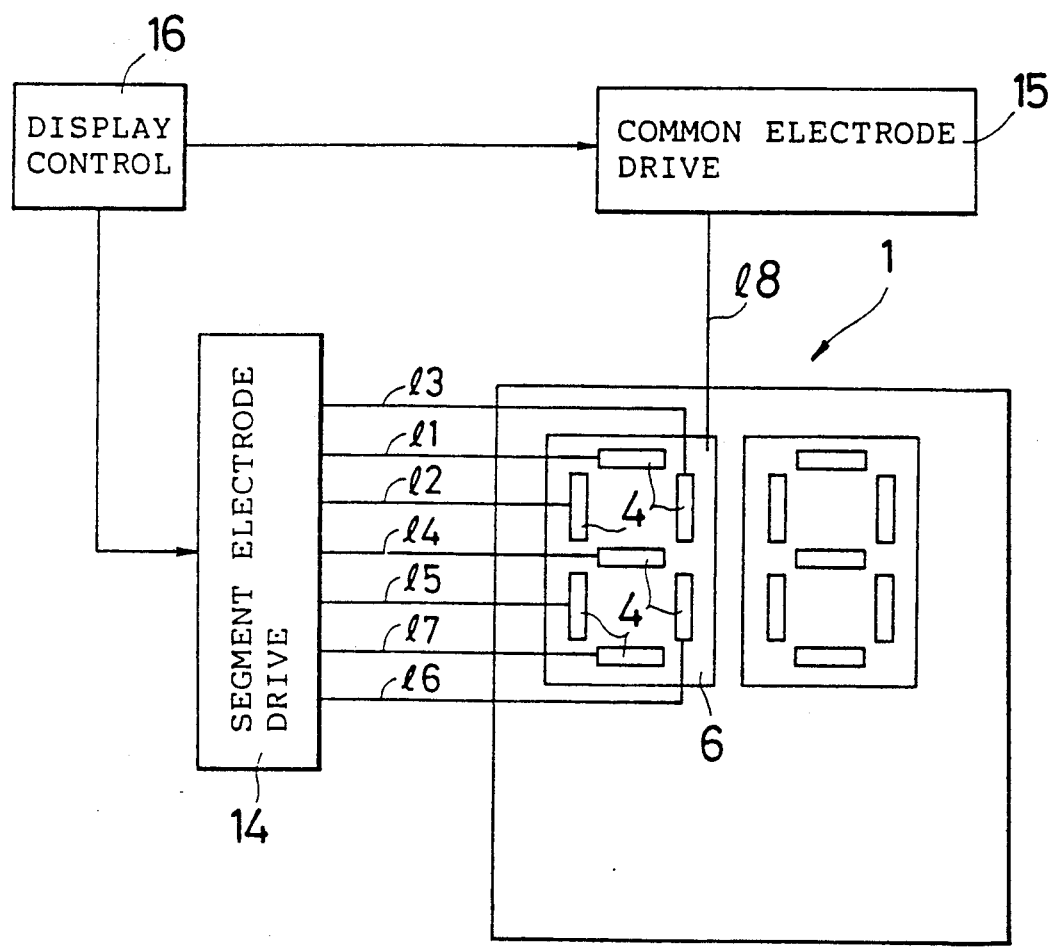
FIG. 12 is a block diagram showing the configuration of the liquid crystal display device 1.

FIG. 12 is a block diagram showing the electrical configuration of the liquid crystal display device 1. The segment electrodes 4, which are a plurality of display electrodes, are arranged so they form a figure eight on the liquid crystal display device 1. Here, a case is explained in which the segment electrodes 4 are formed only in areas corresponding to the red filters R as in FIG. 11 (1) above. Also, the common electrodes 6 are disposed in the area containing the display area corresponding to the segment electrodes 4. The segment electrodes 4 are connected to the segment electrode drive circuit 14 via the respective signal lines 11 to 17, and the common electrodes 6 are connected to the common electrode drive circuit 15 via the line 18. The signal lines 11 to 18 are disposed so they do not effect display. The segment electrode drive circuit 14 and the common electrode drive circuit 15 are connected to the display control circuit 16, and voltages are applied on the segment electrodes 4 and the common electrodes 6 based on the image data supplied from the display control circuit 16.

The liquid crystal layer 7 on which voltage is applied passes light in the case of normally black display, so the display areas corresponding to those segment electrodes 4 on which voltage is applied pass light. Here, as described above, the segment electrodes 4 are formed only in the areas corresponding to the red filters R of the color filter 3, so red is displayed in the display area. At this time, the blockage of light in the liquid crystal display device 1 is not complete in areas other than the display area where voltage is applied and so some light does leak, but since the color filter 3 is provided over the entire surface of the glass substrate 2a, the shape of the color filter 3 cannot be seen and parts where the color filter 3 is provided do not appear colored as in the prior art. Also, since the light passing through the liquid crystal layer 23 becomes white light due to the mixing of the three colors red, green and blue, coloring of areas other than the display area is prevented.

By means of the above configuration, the shape of the color filter 3 cannot be seen and coloring of areas other than the display area due to leaking light is prevented. This greatly improves the display quality of the liquid crystal display device 1.

In this embodiment, the segment electrodes 4 were formed in areas corresponding to the red filters R, but by forming the segment electrodes 4 in the areas corresponding to the green filters G or the blue filters B, green or blue is displayed in the display area.

Further, the segment electrodes 4 can be provided separately so they correspond to two color filters. In this case, by providing segment electrodes 4 separately in areas corresponding to the red filters R and the green filters G, for example, yellow can be displayed through a combination of red light and green light. Also, providing segment electrodes 4 for the red filters R and the blue filters B makes it possible to display cyan. Providing electrodes to all three color filters makes it possible to display white.

The resistance of the transparent electrode 12 can be varied and the voltage applied on the liquid crystal layer 7 varied by adjusting the width of the transparent electrode 12 which connects the segment electrodes 4, whereby intermediate colors can be displayed.

In this embodiment, the color filter 3 is formed from the three color filters red, green and blue, but the color filter 3 can be formed from any two of these colors. Also, the filters are not limited to these three colors red, green and blue, but rather various colors can be used for the filters such as yellow, magenta and cyan. In this case, as well, a filter with only two colors can be used. The color filter 3 can also be formed from filters of four or more colors.

FIG. 13 shows the order in which the color filters R, G and B are arranged and the order of connection of the segment electrodes In FIG. 13, only the connection method for the segment electrodes related to the red filters R are shown for easier understanding, but of course the connection method is same for the green filters G and the blue filters B. FIG. 11 showed a case in which the red filters R were connected linearly in a diagonal direction, but in FIG. 13 (1)–(3), the segment electrodes corresponding to a common color; e.g., red color filters R, are connected in a zigzag. In the case of FIG. (2), connection is diagonal, while in FIG. 13 (1)–(3), connection is generally linear and connection between electrodes is easier. Unlike FIG. 13 (1), in the case of FIG. 13 (2) and (3), the order of arrangement of the color filters R, G and B changes gradually, but connection is generally linear.

In FIG. 13 (1), the filters R, G and B are arranged in basic units comprising a 3×6 matrix M1, and the matrices M1 are arranged in rows. In FIG. 13 (2), the filters R, G and B are arranged in basic units comprising a 3×4 matrix M2, and these matrices M2 are arranged in rows. In FIG. 13 (3), the filters R, G and B are arranged in basic units comprising a 3×6 matrix M3, and these matrices M3 are arranged in rows.

FIG. 14 shows another order of arrangement for the color filters R, G and B and another order of connection for the segment electrodes, where the color filters R, G and B are arranged in a delta. Connection in the case of FIG. 14 (1) is diagonal, but in the case of FIG. 14 (2), connection is generally linear.

Figure 15:
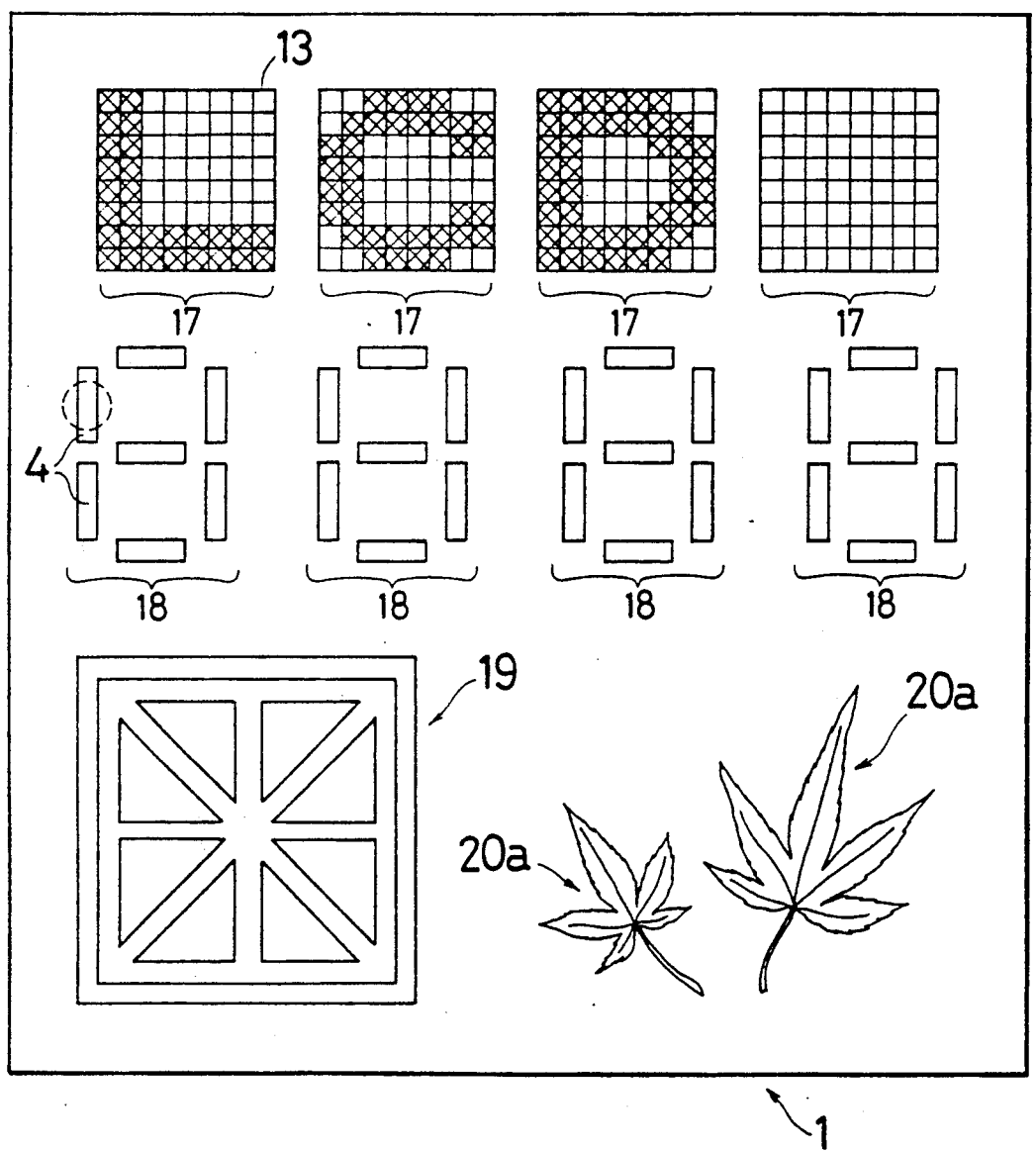
FIG. 15 shows another example of the electrode arrangement for the liquid crystal display device 1.

FIG. 15 shows other embodiments for the electrode arrangement in the display screen of the liquid crystal display device 1. FIG. 15 shows four dot matrix arrays (e.g., LCD display), four seven-segment figure eight arrays, one geometric shape and two graphic design arrays.

At the top of the screen are four electrode arrays 17 in which square electrodes 13 are arranged in an 8×8 matrix. In the middle of the screen are four electrode arrays 18 in which rectangular segment electrodes 4 are arranged so they form a figure eight. At the bottom of the screen, the electrodes 19 are formed in a shape corresponding to a geometric design, and the electrodes 20a and 20b are formed in shapes corresponding to graphic designs representing leaves.

A plurality of square color filters R, G and B are arranged in the display area and the background area in a fine red, green and blue mosaic, and transparent electrodes are disposed so they connect the segment electrodes corresponding to a common color in sequence. The plurality of square color filters R, G and B is arranged in sequences such as those shown in FIG. 13 and FIG. 14. The drive method is explained below using one figure eight segment electrode as an example (the one segment electrode circled by a dotted line in FIG. 15).

Figure 16:
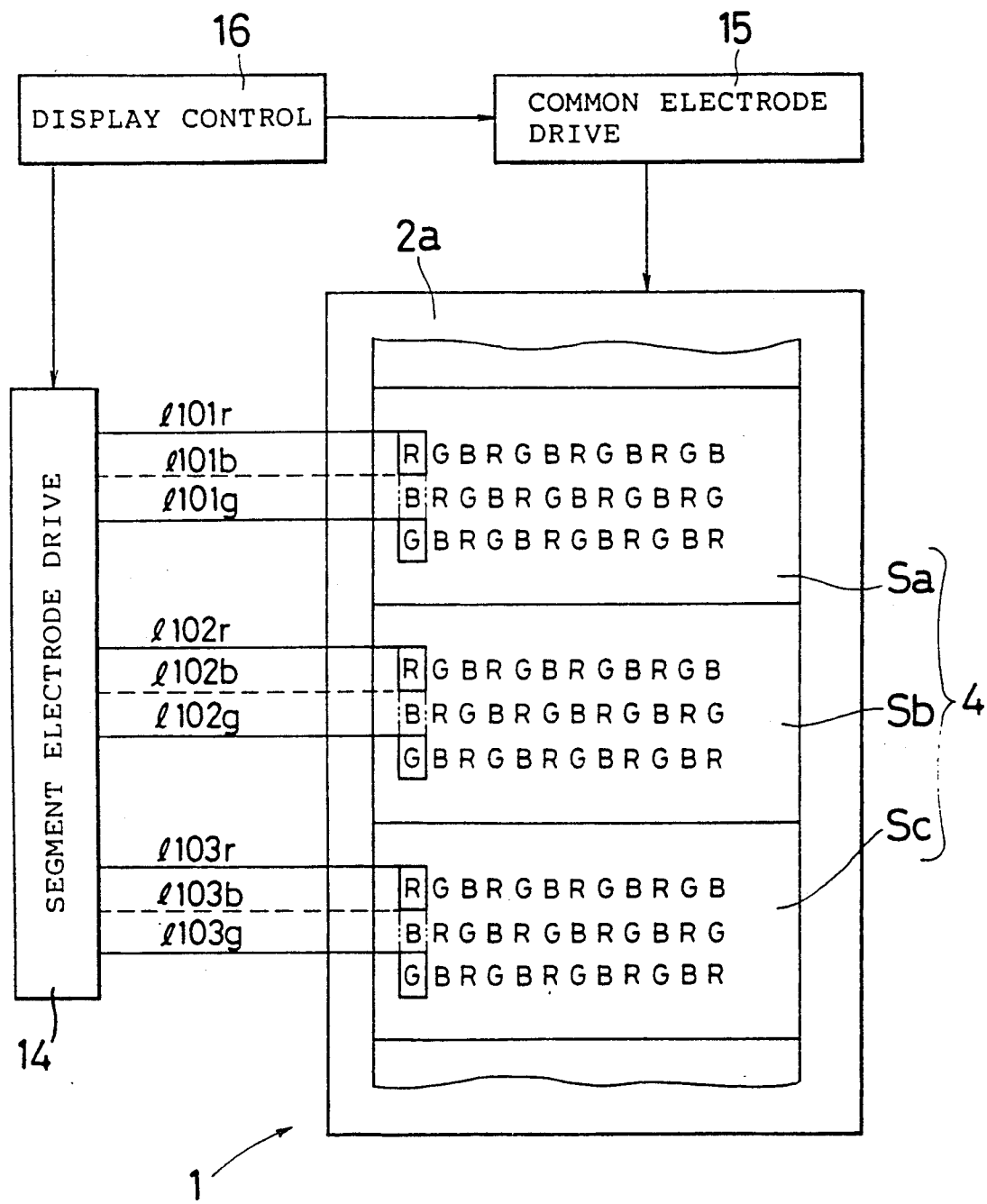
FIG. 16 is used to explain the drive method for the electrodes in FIG. 14.

FIG. 16 is a block diagram for explaining the electrode drive method. Here, the color filter arrangement in FIG. 13 (1) is used. The segment electrode 4 is divided up according to several display areas such as the segment electrode sections Sa, Sb and Sc, and in each display area are disposed the transparent electrode connection lines 1101r, 1101b and 1101g so they correspond respectively to the red filters R, the green filters G and the blue filters B. These segment electrode connection lines 1101r, 1101b and 1101g; 1102r, 1102b and 1102g; 1103r, 1103b and 1103g; . . . are electrically controlled by the segment electrode drive circuit 14. These connection lines 1101r, 1102r and 1103r, . . . are driven by a display color corresponding to a previously set electrode arrangement. For example, the display area corresponding to the segment electrode section Sa can be displayed in red, the display area corresponding to the segment electrode section Sb can be displayed in blue and the display area corresponding to the segment electrode section Sc can be displayed in green, or they can be displayed in a color which is a combination of all three colors.

EMBODIMENT 2

Figure 17:
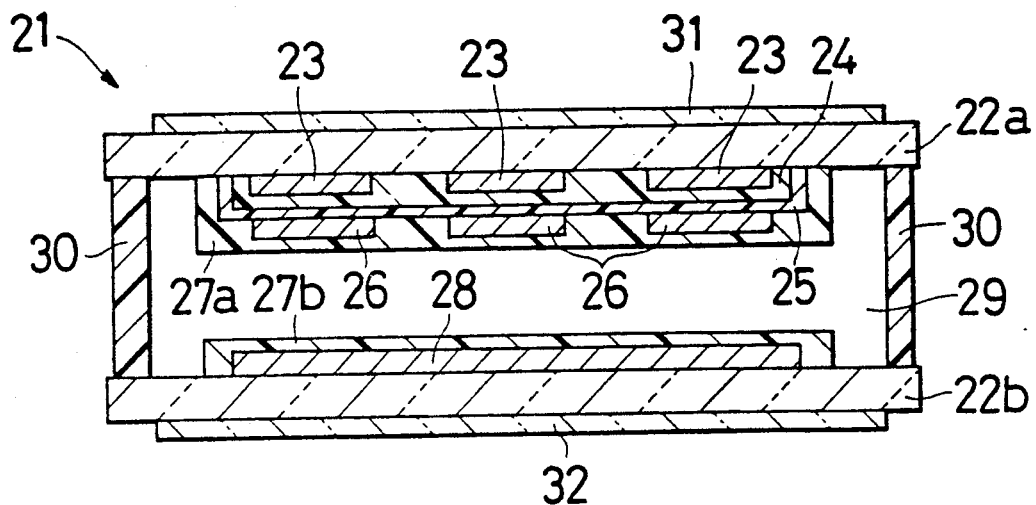
FIG. 17 is a cross section of the color liquid crystal display device 21 which is a second embodiment of this invention.

FIG. 17 is a cross section of a color liquid crystal display device 21 which is a second embodiment of this invention. The color liquid crystal display device 21 has transparent substrates 22a and 22b made from glass, plastic or other material, and on one surface of the transparent substrate 22a, a transparent electrode (first segment electrode) 23 is formed in the area corresponding to the shape to be displayed. A color filter 24 is then formed on the transparent substrate 22a on which the first segment electrode) 23 is formed. The color filter 24 is composed of color filters of three colors; e.g., red filters, green filters and blue filters, arranged in a matrix, for example, and a black light mask, and it is formed over nearly the entire surface of one side of the transparent substrate 22a by a printing process or other process.

An overcoat layer 25 is formed on the surface of the color filter 24 in order to smooth the unevenness of the color filter 24 surface, prevent deterioration of the color filter 24 when the second segment electrode 26, described below, is formed, and improve the adhesion of the second segment electrode 26. After the overcoat layer 25 is formed, the transparent electrode (second segment electrode) 26 is formed by sputtering or other method in the area corresponding to the same shape as the first segment electrode 23. An orientation film 27a is then formed on this surface.

On one surface of the transparent substrate 22b, the transparent electrode (common electrode) 28 is formed in at least the area containing the first segment electrode 23 and the second segment electrode 26, and then the orientation film 27b is formed on that surface.

The transparent substrates 22a and 22b are disposed so that their respective surfaces on which the orientation films 27a and 27b are formed oppose each other, and then the liquid crystal layer 29 is sandwiched in between the transparent substrates 22a and 22b and sealed by the sealant 30.

The polarizer plates 31 and 32 are disposed on the surfaces of the transparent substrates 22a and 22b opposite the liquid crystal layer 29.

A polyamide resin (product name: PIQ; produced by Hitachi Chemical Company) is used for the orientation films 27a and 27b. The orientation films 27a and 27b are formed in a thickness of 600 Å, for example, and they are rubbed with a nylon cloth to form a levorotatory liquid crystal layer, for example, between the transparent substrates 22a and 22b whose direction of orientation of the liquid crystal molecules is twisted 90°.

Plastic spacers (not shown) are inserted between the transparent substrates 22a and 22b to maintain a constant space between them. By means of these spacers, the space between the substrates is maintained at 5 micron, for example. The sealant used to seal the liquid crystal layer 29 is an epoxy resin (produced by Mitsui Tooatsu), for example. A phenyl cyclohexane compound liquid crystal is selected for the liquid crystal layer 29. Cholesteric nonanoate is added to the liquid crystal to make it levorotatory.

The orientation films 27a and 27b may also undergo rubbing treatment that will twist the direction of orientation of the liquid crystal molecules between the transparent substrates 22a and 22b 90° and make the liquid crystal film dextrorotatory. In this case, a phenyl cyclohexane compound liquid crystal to which CB-15 (Merck Company) has been added as the dextrorotatory material is used for the liquid crystal layer 29.

Figure 18:
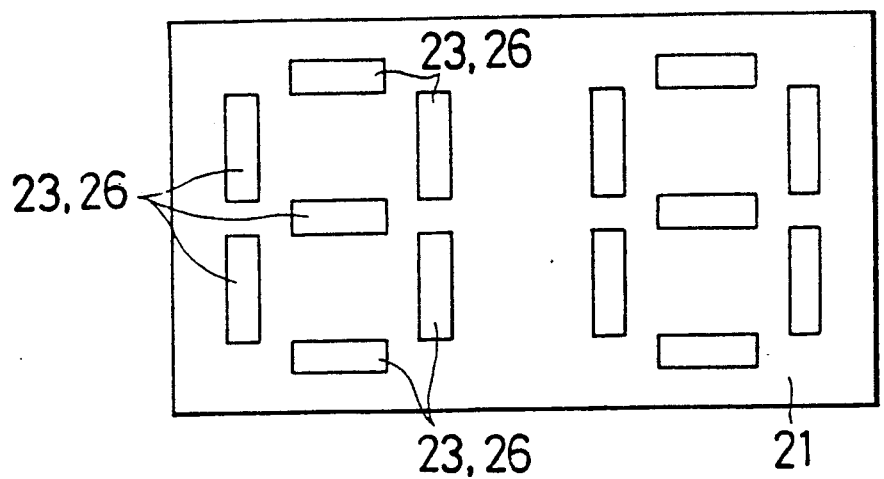
FIG. 18 is a plane view of the liquid crystal display device 21.

FIG. 18 is a plane view of the color liquid crystal display device 21. As shown in FIG. 18, the first segment electrodes 23 are formed in the shape of a rectangle, seven of the first segment electrodes 23 are arranged to form a figure eight, and two of the figure eights are arranged in a row. The second segment electrodes 26 are laid down in the same area as the first segment electrode 23.

Figure 19:
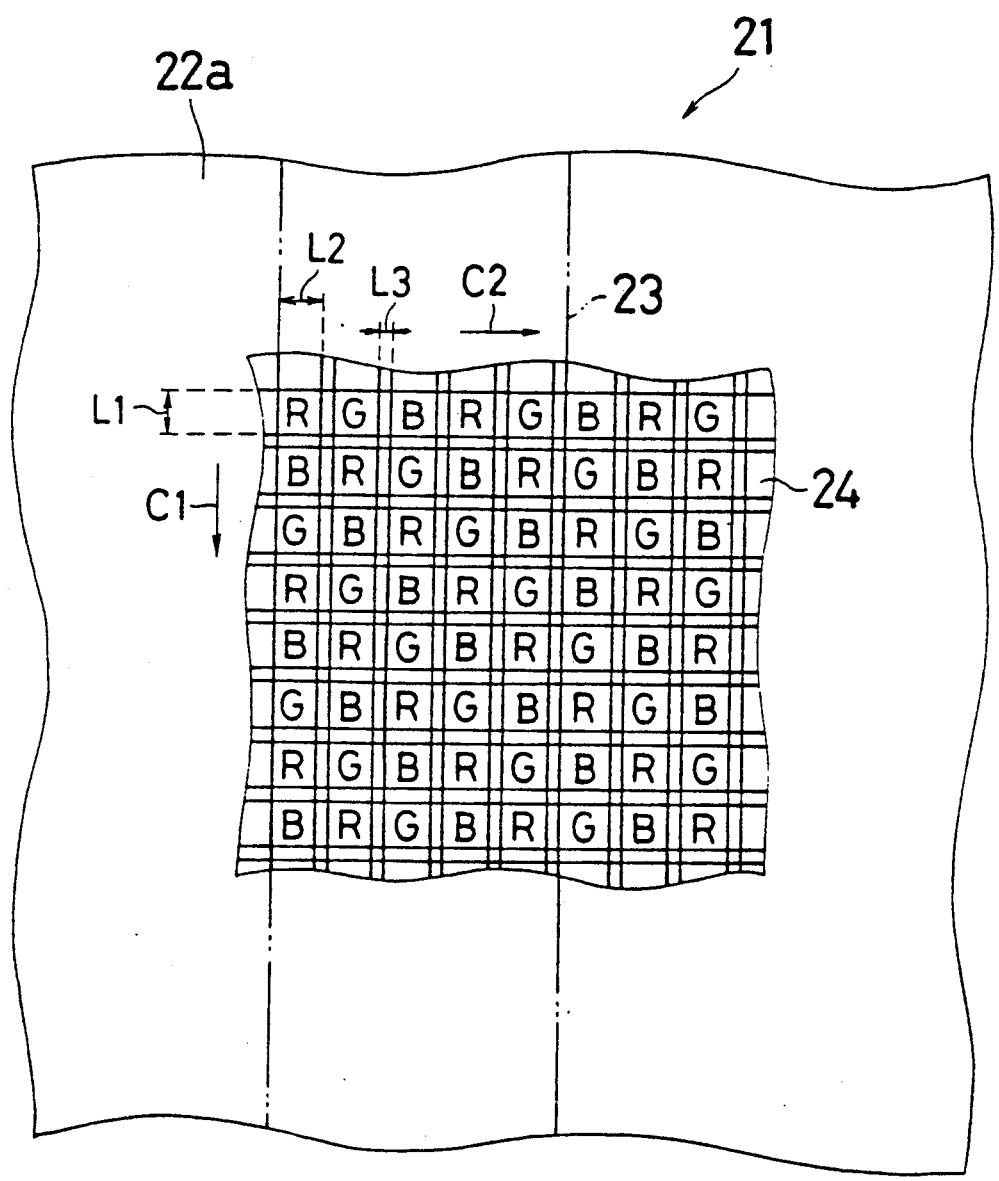
FIG. 19 is an enlarged plane view of the color filter 24.
Figure 20:
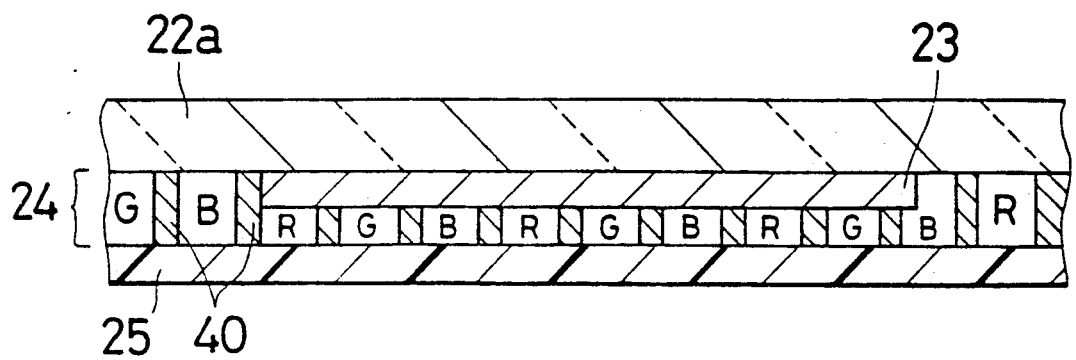
FIG. 20 is an enlarged cross section of the area around the color filter 24.

FIG. 19 is an enlarged plane view of the color filter 24, and FIG. 20 is an enlarged cross section of the area around the color filter 24. In the color liquid crystal display device 21, the color filter 24 selected as the color selection member is provided over nearly the entire surface of the transparent substrate 22a. The color filter 24 is formed by arranging the red, green and blue filters in a matrix or mosaic.

In FIG. 19 and FIG. 20, the red filters are indicated by the reference code R, the green filters by the reference code G and the blue filters by the reference code B. The filters R, G and B are finely shaped and small enough to make them indistinguishable by the naked eye.

As an example, rectangular filters R, G and B whose length L1 is 330 micron and width L2 is 80 micron are used, and the interval L3 between filters is 30 micron. Therefore, the area formed by the three filters R, G and B lined up in the direction of the width C2 of the filter is a square 330 micron×330 micron.

The interval L3 between filters is determined by the precision of the photoprocess and other methods used to produce the color filter, but it is generally 15 micron to 40 micron.

The filters are arranged in a repeating R-G-B sequence in the direction of the width C2 of the filter and a repeating R-B-G sequence in the direction of the length C1 of the filter. The shape of the filters R, G and B may be square or other shape.

A black light mask 40 is also formed between each of the filters R, G and B. This light mask 40 is made from chrome (Cr) or a black pigment.

Figure 21:
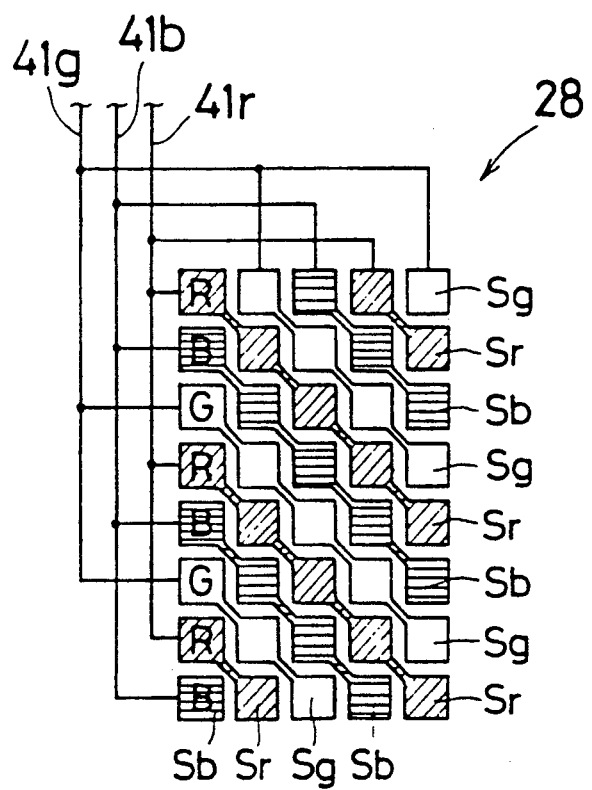
FIG. 21 is an enlarged plane view of the segment electrode.

FIG. 21 is an enlarged plane view of the first segment electrode 23. As described above, the red, green and blue square color filters R, G and B are arranged in a plurality of matrices or mosaics on the transparent substrate 22a, and this invention is a color liquid crystal display device 21 in which transparent electrodes have been disposed as signal lines to sequentially connect segment electrodes corresponding to color filters of the same color.

The first segment electrodes 23 are made up of the electrodes Sr for red, the electrodes Sg for green and the electrodes Sb for blue. The electrodes Sr, Sg and Sb are formed in areas corresponding to the filters R, G and B, and each of the electrodes Sr, Sg and Sb are connected by the respective transparent electrodes 41r, 41g and 41b which function as signal lines. Using this connection method, the seven colors red, white, green, dark green, blue, white and purple can be displayed in the desired display area by selecting the desired segment electrodes on which voltage is to be applied. The second segment electrodes 26 have the same configuration as the first segment electrodes 23.

Figure 22:
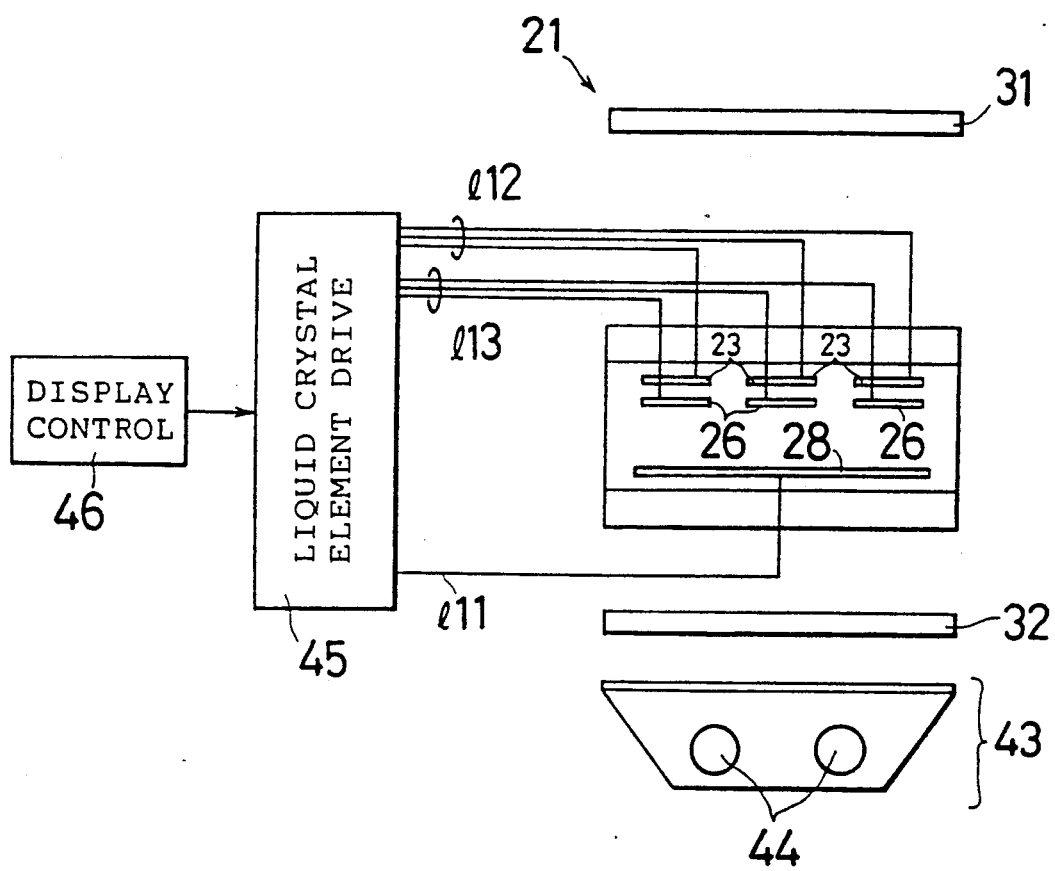
FIG. 22 is a block diagram showing the electrical configuration of the color liquid crystal display device 21.

FIG. 22 is a block diagram showing the electrical configuration of the color liquid crystal display device 21. A back light 43 is positioned on the side opposite the liquid crystal elements of the polarizer plate 32, and by passing and blocking the light from the back light 43 by means of the liquid crystal elements, a plurality of colors as described below can be displayed on the color liquid crystal display device 21. The liquid crystal elements are controlled by the liquid crystal element drive circuit 45. The liquid crystal element drive circuit 45 applies voltage on the common electrodes 28 via the signal line (11, operating voltage on the selected first segment electrodes 23 via the signal line group 112, and operating voltage on the selected second segment electrodes 26 via the signal line group 113 based on display control signals from the display control circuit 46. By this means, color display can be performed on the color liquid crystal display device 21. Whether the same color or not, the level of brightness differs depending on whether voltage is applied on only one of the first and second segment electrodes 23 and 26 or voltage is applied on both of the first and second segment electrodes 23 and 26, so two levels of brightness can be displayed. Therefore, color display of up to 27 colors can be performed.

Below is an explanation of normally white display and normally black display in the color liquid crystal display device 21 described above. Here, of the liquid crystal molecules of the liquid crystal layer 29, those nearest the transparent substrate 22b are oriented in a direction perpendicular to the surface of the paper in FIG. 17, and as you approach the transparent substrate 22a, the molecules are gradually twisted to the right so that those molecules nearest the transparent substrate 22a are oriented in a direction parallel with the surface of the paper in FIG. 17.

(1) Normally White Display

Normally white display is a display method whereby light is passed through the liquid crystal layer 29 so the background appears white and voltage is applied on the area of the liquid crystal layer 2 corresponding to the shape to be displayed in order to change the orientation of the liquid crystal molecules and block the light to display the desired shape. Therefore, the direction of polarization of the polarizer plate 32 is perpendicular to the surface of the paper in FIG. 17, and the direction of polarization of the polarizer plate 31 is parallel to the surface of the paper in FIG. 17. By this means, the light passing through the polarizer plate 32 is twisted 90° by the liquid crystal layer 29 and is allowed to pass through the polarizer plate 31. At this time, the light passing through the color filter 24, which is made up of fine, square filters R, G and B as shown in FIG. 18, becomes white light due to the mixing of red light, green light and blue light. That is, when voltage is not applied, white is displayed as the background color on the color liquid crystal display device 21.

The liquid crystal molecules of the liquid crystal layer 29 on which voltage is applied are oriented in the direction of the electric field. Therefore, the linear polarized light perpendicular to the surface of the paper in FIG. 17 and which passes through the polarizer plate 31 passes through the liquid crystal layer 29 with its polarized condition remaining nearly unchanged. Here, since the direction of polarization of the polarizer plate 31 is parallel to the surface of the paper in FIG. 17, the light passing through the liquid crystal layer 29 cannot pass through the polarizer plate 31.

The liquid crystal layer 29 functions as a shutter through the operation (on) and non-operation (off) of voltage. TABLE 2 below shows the relationship between the on/off state of the segment electrodes, the function of the liquid crystal layer as a light shutter and the display color.

In TABLE 2, "○" indicates an open light shutter condition and "●" indicates a closed light shutter condition.

TABLE 2

| Segment electrode on/off state | | | Light shutter | | | |
|---|---|---|---|---|---|---|
| Sr | Sg | Sb | R | G | B | Display color |
| OFF | OFF | OFF | ○ | ○ | ○ | White |
| ON | OFF | OFF | ● | ○ | ○ | Greenish blue (cyan) |
| OFF | ON | OFF | ○ | ● | ○ | Rose color (magenta) |
| OFF | OFF | ON | ○ | ○ | ● | Yellow |
| ON | ON | OFF | ● | ● | ○ | Blue |
| ON | OFF | ON | ● | ○ | ● | Green |

TABLE 2-continued

| Segment electrode on/off state | | | Light shutter | | | |
|---|---|---|---|---|---|---|
| Sr | Sg | Sb | R | G | B | Display color |
| OFF | ON | ON | c | • | • | Red |
| ON | ON | ON | • | • | • | Black |

(2) Normally Black Display

Normally black display is a display method whereby light is not allowed to pass through the liquid crystal layer 29 when voltage is not applied so the background color appears black, and the desired shape is displayed by operating voltage on the liquid crystal layer 29 to allow light to pass. Therefore, the polarizer plates 31 and 32 are disposed so their direction of polarization is parallel polarization. That is, the direction of polarization of the polarizer plates 31 and 32 may be either perpendicular to the surface of the paper in FIG. 17 or parallel to the surface of the paper in FIG. 17. By this means, light cannot pass through the liquid crystal layer 29 when voltage is not applied. Therefore, black is displayed as the background color of the liquid crystal display device 21.

As in the case of normally white display, the liquid crystal layer 29 functions as a light shutter through the operation and non-operation of voltage. TABLE 3 below shows the relationship between the on/off state of the segment electrodes, the function of the liquid crystal layer as a light shutter and the display color.

In TABLE 3, "○" indicates an open light shutter condition and "●" indicates a closed light shutter condition.

TABLE 3

| Segment electrode on/off state | | | Light shutter | | | |
|---|---|---|---|---|---|---|
| Sr | Sg | Sb | R | G | B | Display color |
| OFF | OFF | OFF | • | • | • | Black |
| ON | OFF | OFF | ○ | • | • | Red |
| OFF | ON | OFF | • | ○ | • | Green |
| OFF | OFF | ON | • | • | ○ | Blue |
| ON | ON | OFF | ○ | ○ | • | Yellow |
| ON | OFF | ON | ○ | • | ○ | Rose color (magenta) |
| OFF | ON | ON | • | ○ | ○ | Greenish blue (cyan) |
| ON | ON | ON | ○ | ○ | ○ | White |

Regardless of whether normally white display or normally black display is performed, the voltage applied on the liquid crystal layer 29 varies depending on whether voltage is applied on both the first and second segment electrodes 23 and 26 or on only one of the first and second segment electrodes 23 and 26. By this means, the transmissivity of the light passing through the liquid crystal layer 29 can be varied, so even the same colors can be displayed in varying levels.

By means of the above embodiment, in addition to the display of eight colors, 27 colors can be displayed by changing the level of brightness. This increases the diversity of display and facilitates colorful display in the color liquid crystal display device 21.

Further, by arranging the color filter in a matrix or a mosaic, the degree of mixing and clarity of the displayed colors as observed visually and display quality are greatly improved when displaying different colors through the combination of multiple filters of differing colors.

In the transparent substrate 22a on which the color filter 24 is formed in this embodiment, the first and second segment electrodes 23 and 26 were formed with the color filter 24 between them, but the common electrode 28 of the opposing transparent substrate 22b may be formed in a two-layer structure with a silicon oxide or other insulating film between the two layers and still achieve the same graded level of display as in the above embodiment.

In this embodiment, the common electrode 28 does not illuminate electrode sections unrelated to display, is formed so it is larger than the first and second segment electrodes 23 and 26 formed on the transparent substrate 22a, and is designed so that voltage greater than the threshold voltage is not applied on sections other than the necessary sections regardless of whether voltage is applied on the first or second segment electrode 23 or 26. However, it is possible to give the common electrode a two-layer structure and perform gray scale levels of display with the opposing pair of electrodes. Further, in this embodiment, a twisted nematic liquid crystal in which the liquid crystal molecules were twisted 90° was used for the liquid crystal layer, but a super twisted nematic liquid crystal with a twist of 180° to 270° can also be used.

EMBODIMENT 3

Figure 23:
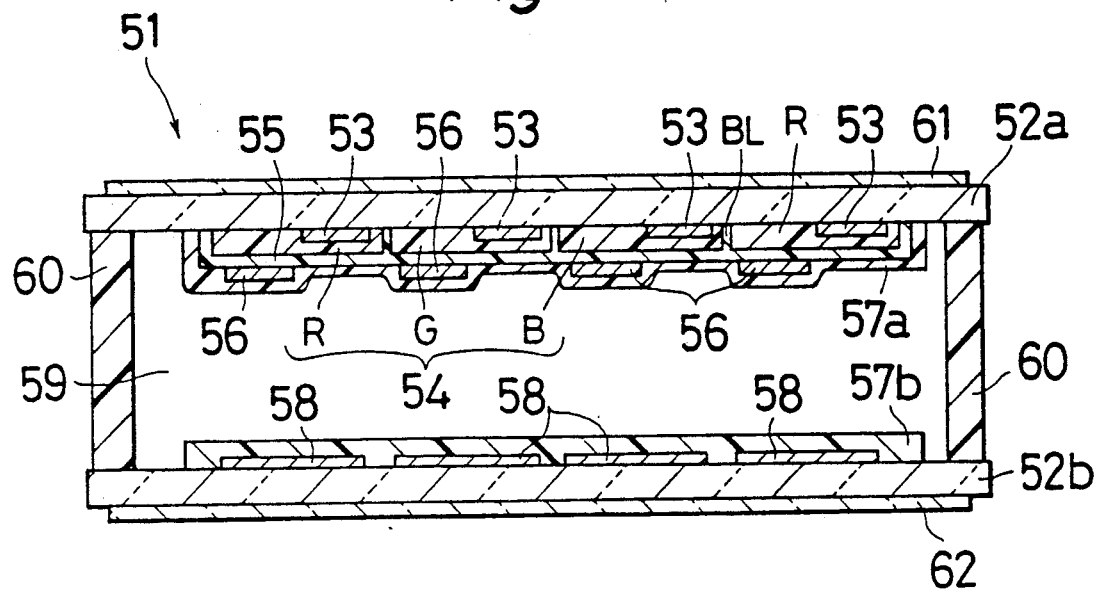
FIG. 23 is a cross section of the color liquid crystal display device 51 which is a third embodiment of this invention.

FIG. 23 is a cross section of the color liquid crystal display device 51 which is a third embodiment of this invention. The color liquid crystal display device 51 comprises a pair of transparent substrates 52a and 52b made from glass, plastic or other material, and the transparent electrodes (first segment electrodes) 53 are formed on one surface of the transparent substrate 52a in the area corresponding to the shape to be displayed. The color filter 54 is formed on the transparent substrate 52a on which the first segment electrodes 53 are formed. The color filter 54 comprises color filters of three colors; e.g., the red filter R, green filter G and blue filter B, formed in the shape of stripes, for example, and a black light mask layer BL provided in the intervals between filters, and the color filter 54 is formed over nearly the entire surface on one side of the transparent substrate 52a by a dyeing process, a printing process, an electrodeposition process or a pigment diffusion process.

A protective film 55 is formed on the surface of the color filter 54 in order to smooth the roughness of the color filter 54, prevent deterioration of the color filter 54 when the second segment electrodes 56, described below, are formed, and improve the adhesion of the second segment electrodes 56. CZ-113 (produced by Nissan Chemical Co., Ltd.) is used as the protective film 55, which is formed by an offset printing process, etc. After the protective film 55 is formed, a transparent conductive film (second segment electrodes 56) is formed in an area within the predetermined display area where the first segment electrodes 53 are not formed. The orientation film 57a is then formed on that surface.

The transparent electrodes (common electrodes) 58 are formed on one surface of the transparent substrate 52b in an area containing at least the first and second segment electrodes 53 and 56, and then the orientation film 57b is formed on that surface.

The transparent substrates 52a and 52b are disposed so that their respective surfaces on which the orientation films 57a and 57b are formed oppose each other, and the liquid crystal layer 59 is disposed between the transparent substrates 52a and 52b and sealed by the sealant 60. The polarizer plates 61 and 62 are formed on the respective surfaces of the transparent substrates 52a and 52b opposite the liquid crystal layer 59. The transparent substrates 52a and 52b may be made of a plastic film. A polyamide resin (product name: PIQ, produced by Hitachi Chemical Co., Ltd.) was used for the orientation films 57a and 57b. The orientation films 57a and 57b are formed to a thickness of 600 Å, for example, and they are treated by rubbing with a nylon cloth to form a levorotatory liquid crystal layer, for example, between the transparent substrates 52a and 52b in which the direction of orientation of the liquid crystal molecules is twisted 90°.

The protective film 55 need not be formed in cases in which the second segment electrodes 56 can be formed on the color filter layer 54 without forming the protective film 55.

Plastic spacers (not shown) are inserted between the transparent substrates 52a and 52b in order to keep the interval between the substrates constant. The interval between the substrates is set at 5 micron, for example, by these spacers. An epoxy resin (produced by Mitsui Tooatsu Co., Ltd.), for example, is used as the sealant 60 to seal the liquid crystal layer 59. A phenyl cyclohexane compound liquid crystal is selected for the liquid crystal layer 59. Cholesteric nonanoate is further to the liquid crystal layer to make it levorotatory.

The orientation films 57a and 57b can be treated by rubbing with a nylon cloth to form a dextrorotatory liquid crystal layer between the transparent substrates 52a and 52b in which the direction of orientation of the liquid crystal molecules is twisted 90°. In this case, a phenyl cyclohexane compound liquid crystal to which CB-15 (produced by Merck Company) has been added as the dextrorotatory chiral material is used for the liquid crystal layer 59.

Figure 24:
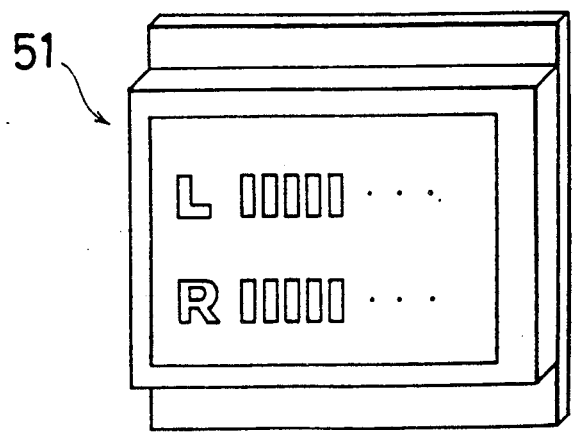
FIG. 24 is an oblique view of the color liquid crystal display device 51.

FIG. 24 is an oblique view of the color liquid crystal display device 51. In this embodiment, the case in which the color liquid crystal display device 51 is used as a level meter on a cassette tape recorder or other audio device is explained. The characters "L" and "R" and multiple rectangular areas which are display areas are provided on the color liquid crystal display device 51. The first and second segment electrodes 53 and 56 are provided on the plurality of rectangular areas. The "L" and "R" characters can be continually displayed by applying light blocking members with shapes conforming to the shapes of the respective characters to the surface of the color liquid crystal display device 51, or the first and second segment electrodes 53 and 56 shaped to conform to the shape of the respective characters can be disposed and displayed in the desired color as required.

Figure 25:
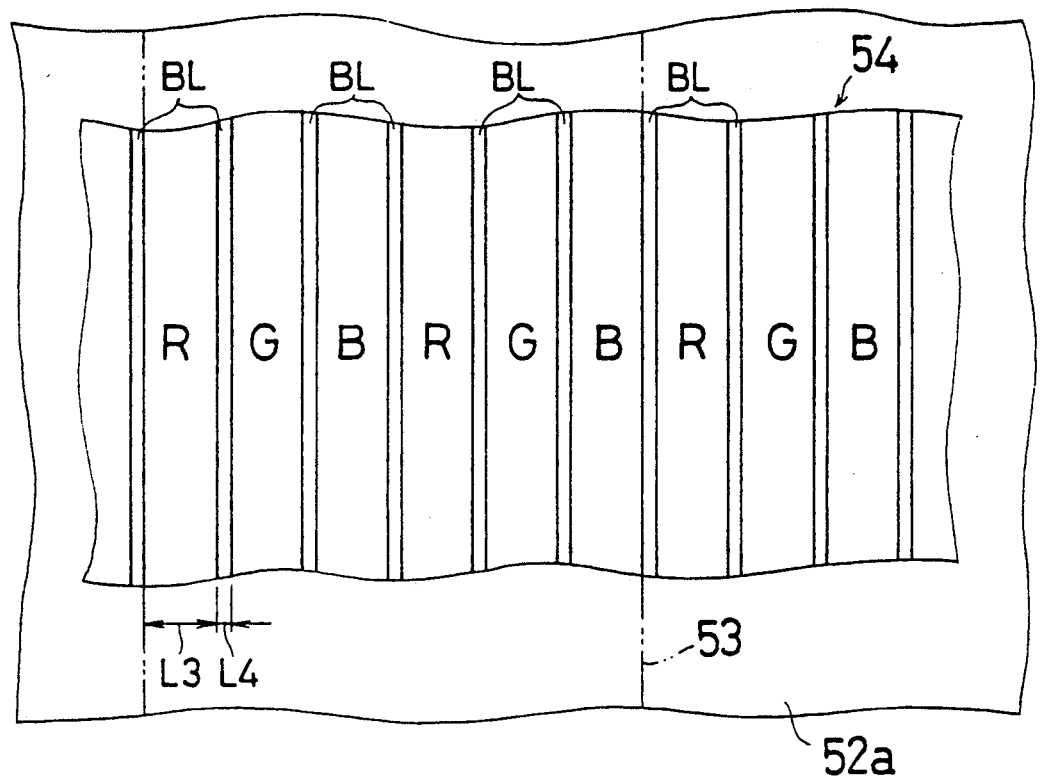
FIG. 25 is an enlarged plane view of color filter layer 54.
Figure 26:
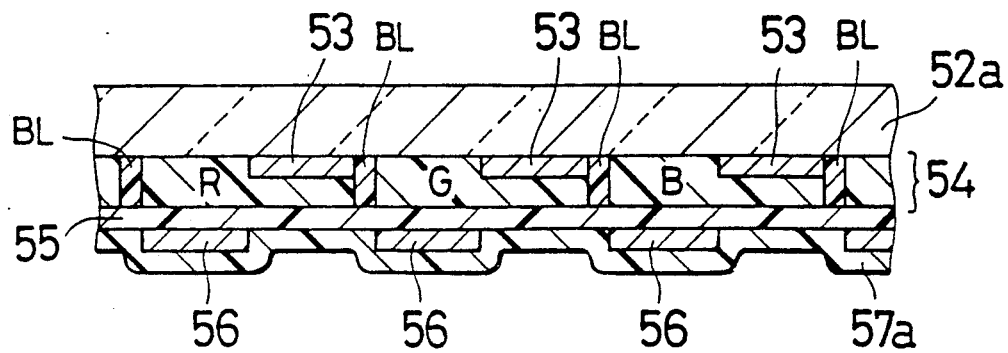
FIG. 26 is an enlarged cross section of the area around the color filter layer 54.

FIG. 25 is an enlarged plane view of the color filter 54, and FIG. 26 is an enlarged cross section of the area around the color filter 54. The color filter 54, which is the color selection member, is formed over nearly the entire surface of the transparent substrate 52a in the color liquid crystal display device 51. The color filter 54 is formed from stripe-shaped red, green and blue filters.

In FIG. 25 and FIG. 26, the red filters are indicated by the reference code R, the green filters by the reference code G and the blue filters by the reference code B. The size of the filters R, G and B is small enough to make them indistinguishable by the naked eye.

As an example, stripe-shaped filters R, G and B whose width L3 is 100 micron are used, and the interval L4 between filters is set at 10 micron. A black light mask BL made from chrome (Cr) or a black pigment is formed between the filters.

Figure 27:
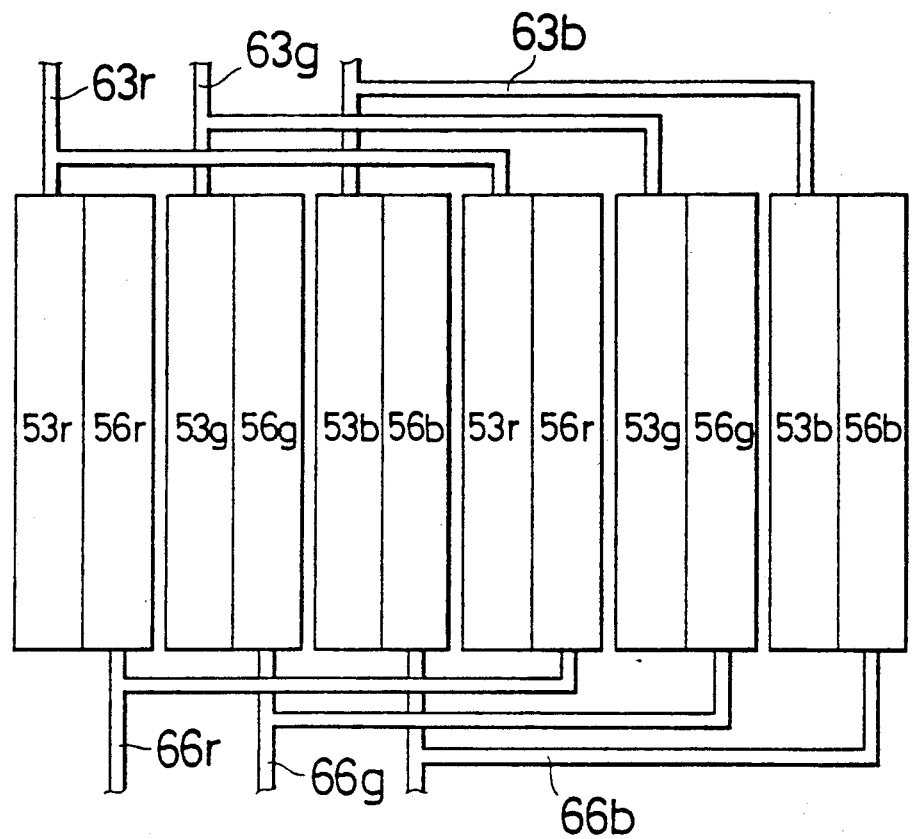
FIG. 27 is an enlarged plane view of the first and second segment electrodes 53 and 56.

FIG. 27 is an enlarged plane view of the first and second segment electrodes 53 and 56. As described above, the red, green and blue stripe-shaped color filters R, G and B are arranged on the transparent substrate 52a, and this invention is the color liquid crystal display device 51 in which transparent electrodes are used as signal lines to connect segment electrodes corresponding to color filters of the same color in sequence.

The first segment electrodes 53 are made up of the electrode 53r for red, the electrode 53g for green and the electrode 53b for blue. The electrodes 53r, 53g and 53b are formed over about one half of the area corresponding to the respective filters R, G and B, and the electrodes 53r, 53g and 53b are connected by the respective transparent electrodes 63r, 63g and 63b which function as signal lines. The second segment electrodes 56 are made up of the electrode 56r for red, the electrode 56g for green and the electrode 56b for blue. The electrodes 56r, 56g and 56b are formed in those areas corresponding to the respective filters R, G and B where the first segment electrodes 53 are not formed, and each of the electrodes 56r, 56g and 56b are connected by the transparent electrodes 66r, 66g and 66b which function as signal lines. A width of 50 micron and length of 330 micron, for example, are selected for the electrodes 53r, 53g and 53b, and 56r, 56g and 56b. Therefore, the first and second segment electrodes 53 and 56 are formed every 50 micron in the direction of width.

By using this connection method and selecting the segment electrodes on which voltage is to be applied, the seven colors red, yellow, green, greenish blue, blue, white and purple can be displayed in the desired display area.

Even when the same color is displayed, the level of brightness differs depending on whether voltage is applied on only one of the first and second segment electrodes 53 and 56 or on both of the first and second segment electrodes 53 and 56, thus facilitating display in two levels. Therefore, color display of up to 27 colors can be performed.

Figure 28:
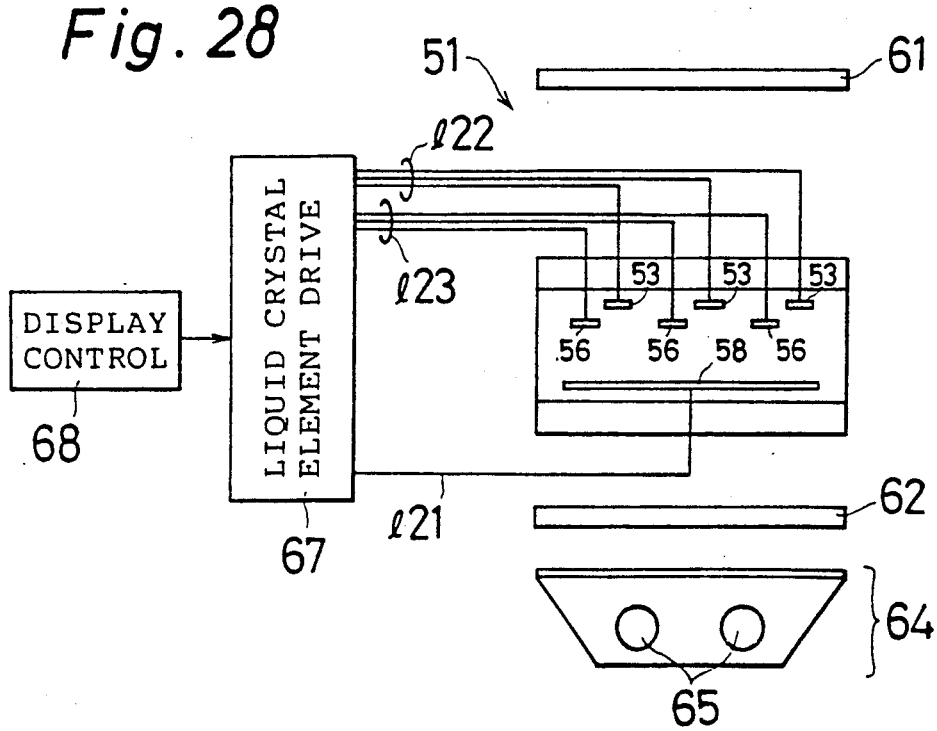
FIG. 28 is a block diagram showing the electrical configuration of the color liquid crystal display device 51.

FIG. 28 a is block diagram showing the electrical configuration of the color liquid crystal display device 51. A back light 64 is disposed on the side of the polarizer plate 62 opposite the liquid crystal element, and by passing or blocking the light from the back light using the liquid crystal element, a plurality of colors as described below can be displayed on the color liquid crystal display device 51. The liquid crystal element is driven by the liquid crystal element drive circuit 67. The liquid crystal element drive circuit 67 applies voltage on the common electrodes 58 via the signal line 121, on the selected first segment electrode 53 via the signal line group 122, and on the second segment electrodes 56 via the signal line group 123 based on display control signals from the display control circuit 68.

In the color liquid crystal display device of this embodiment, as well, normally white display and normally black display can be performed by applying or not applying voltage on the liquid crystal layer 59 according to TABLE 2 and TABLE 3 above.

Regardless of whether normally white display or normally black display is performed, the area on which voltage is applied in the display area varies depending on whether voltage is applied on both the first and second segment electrodes 53 and 56 or on only one of the first and second segment electrodes 53 and 56. By this means, the amount of light transmitted in the display area can be changed, so even the same color can be displayed in different levels of brightness.

By means of the above embodiment, in addition to the normal eight colors, up to 27 colors can be displayed by varying the level of brightness. By this means, the diversity of display is improved and rich colorful display becomes possible in the color liquid crystal display device 51.

In this embodiment, the color filters were stripe shaped, but rectangular-shaped color filters can be arranged in a matrix or mosaic. When the color filters are arranged in a matrix or mosaic, display quality and the mixing and clarity of the displayed colors as observed visually when different colors are displayed by combining multiple color filters of differing colors are improved.

The first and second segment electrodes 53 and 56 are formed with the color filter layer 54 between them, so a structure is possible in which there is no space between dots and the electrodes are electrically isolated. By this means, a color liquid crystal display device 51 with good illumination is realized.

Further, since there is a sufficient interval between adjacent electrodes on the same surface, short circuits between electrodes and broken wires are prevented.

In this embodiment, a twisted nematic liquid crystal in which the liquid crystal molecules were twisted 90° was used for the liquid crystal layer, but a super twisted nematic liquid crystal with a twist of 180 to 270 can also be used.

EMBODIMENT 4

Figure 29:
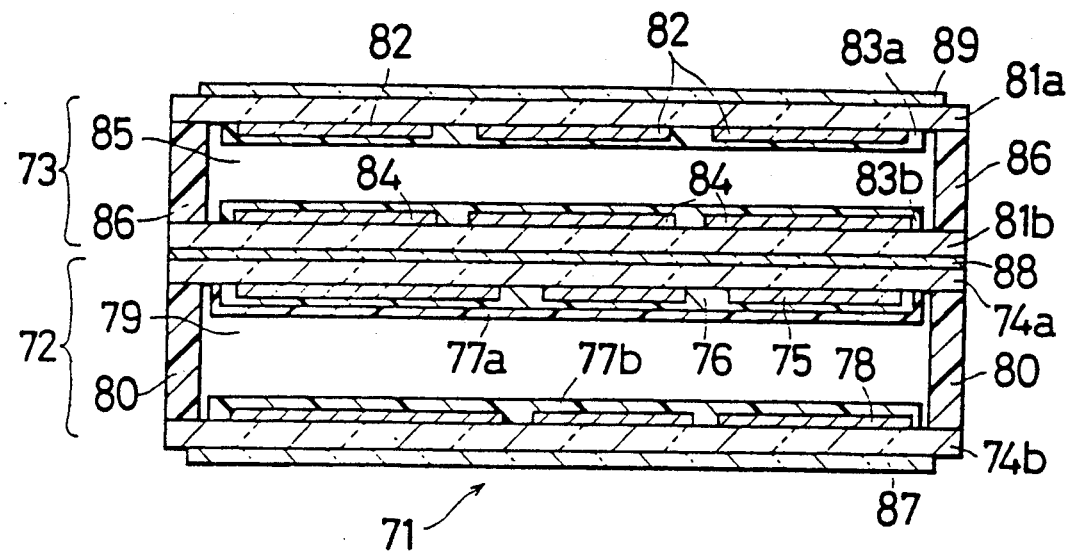
FIG. 29 is a cross section of the liquid crystal display device 71 which is a fourth embodiment of this invention.
Figure 30:
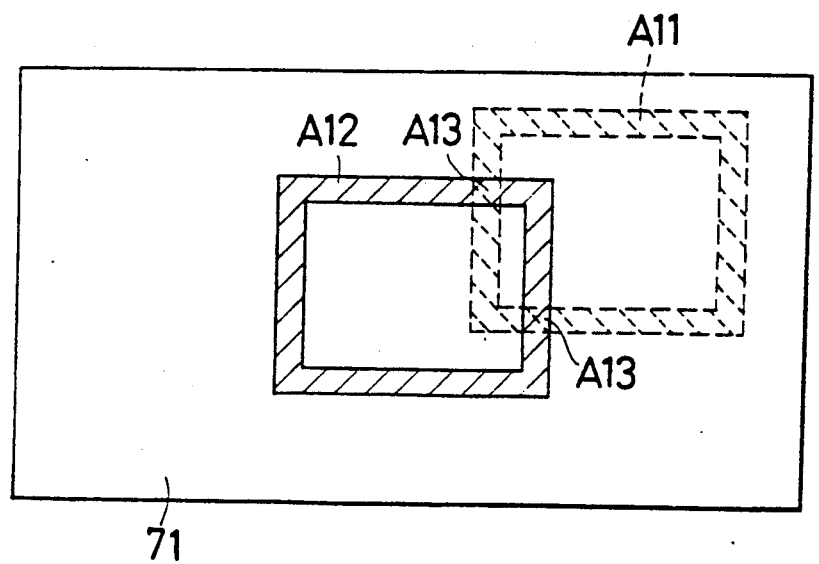
FIG. 30 is a plane view of the color liquid crystal display device 71.

FIG. 29 is a cross section of the color liquid crystal display device 71 which is a fourth embodiment of this invention, and FIG. 30 is a plane view of the color liquid crystal display device 71. The color liquid crystal display device 71 has liquid crystal elements for two twisted nematic modes; i.e., liquid crystal element 72 for color display and liquid crystal element 73 for black and white display.

The liquid crystal display device 71 comprises a pair of transparent substrates 74a and 74b made of glass, plastic or other material, and on one surface of the transparent substrate 74a are formed light-transmissive segment electrodes 76 in the area corresponding to the area A11 shown in FIG. 30. The segment electrodes 76 have the same configuration as the first segment electrodes 23 described above. The color filter 76 is formed over nearly the entire surface of the transparent substrate 74a on which the segment electrodes 75 are formed, and the orientation film 77a is formed on the color filter 76. The color filter 76 has the same configuration as the color filter layer 24 described above. The light-transmissive common electrodes 78 are formed on one surface of the transparent substrate 74b in the area containing at least the segment electrodes 75, and the orientation film 77b is formed on top of these. The transparent substrates 74a and 74b are disposed so that their respective surfaces on which the orientation films 74a and 74b are formed oppose each other. The twisted nematic liquid crystal layer 79 is sandwiched between the transparent substrates 74a and 74b and sealed with the sealant 89.

A polyamide resin is used for the orientation films 77a and 77b. The orientation films 74a and 74b are formed to a thickness of 600 Å, for example, and are treated by rubbing with a nylon cloth to form a levorotatory liquid crystal layer between the transparent substrates 74a and 74b in which the direction of orientation of the liquid crystal molecules is twisted 90°.

Plastic spacers (not shown) are inserted between the transparent substrates 74a and 74b in order to keep the interval between them constant. These spacers maintain the interval between the substrates at 5 micron, for example. An epoxy resin, for example, is used as the sealant 80 to seal the liquid crystal layer 79. A phenyl cyclohexane compound liquid crystal is used for the liquid crystal layer 79. Further, cholesteric nonanoate is added to the liquid crystal layer to make it levorotatory.

The liquid crystal element 73 for black and white display comprises a pair of transparent substrates 81a and 81b made from glass, plastic or other material, and a plurality of light-transmissive segment electrodes 82 are formed on one side of the transparent substrate 81a in the range corresponding to the display area A12 in FIG. 30. The orientation film 83a is formed on the transparent substrate 81a where the segment electrodes 82 are formed. The light-transmissive common electrodes 84 are formed on one side of the transparent substrate 81b in an area containing at least the segment electrodes 82, and then the orientation film 83b is formed on the transparent substrate 81b where the common electrodes 84 are formed. The transparent substrates 81a and 81b are disposed so that their respective surfaces on which the orientation films 83a and 83b are formed oppose each other. The twisted nematic liquid crystal layer 85 is sandwiched between the transparent substrates 81a and 81b and sealed with the sealant 86.

A polyamide resin is used for the orientation films 83a and 83b which are treated by rubbing with cloth to form a dextrorotatory liquid crystal layer between the transparent substrates 81a and 81b in which the direction of orientation of the liquid crystal molecules is twisted 90°.

A phenyl cyclohexane compound liquid crystal is used for the liquid crystal layer 85. CB-15 (produced by Merck Company) is added to this liquid crystal layer as a dextrorotatory chiral material. As in the case of the liquid crystal element 27 for color display described above, plastic spacers are inserted between the transparent substrates 81a and 81b to keep the interval between them constant. The interval between the transparent substrates is set at 5 micron, for example.

The segment electrodes 75 and 82 and the common electrodes 78 and 84 are formed from an indium stannic acid compound (ITO). ITO with an intermediate surface resistance of 20 to 50 ohms/ is commonly used, but a low-resistance compound may also be used.

The liquid crystal element 72 for color display and the liquid crystal element 73 for black and white display are disposed so that their respective transparent substrate 74a and transparent substrate 81b oppose each other. The polarizer plate 87 is disposed on the side of the liquid crystal element 72 for color display opposite the liquid crystal element 73 for black and white display, and the polarizer plate 89 is disposed on the side of the liquid crystal element 73 for black and white display opposite the liquid crystal element 72 for color display. The polarizer plate 88 is disposed between the liquid crystal element 72 for color display and the liquid crystal element 73 for black and white display.

FIG. 31 is a figure for explaining the direction of polarization of the polarizer plates 87, 88 and 89 and the direction of orientation of the liquid crystal molecules in the liquid crystal layers 79 and 85 in the color liquid crystal display device 71. FIG. 31 (1) shows the absorption axis R1 of the polarizer plate 89. FIG. 31 (2) shows the direction of orientation and the direction of twist of the liquid crystal molecules in the liquid crystal layer 85 of the liquid crystal element 73 for black and white display. The direction of orientation of the liquid crystal molecules nearest the transparent substrate 81a is indicated by the arrow R2, and this direction of orientation R2 is perpendicular to the absorption axis R1 of the polarizer plate 89. The direction of orientation of the liquid crystal molecules nearest the transparent substrate 81b is indicated by the arrow R3, so the liquid crystal molecules of the liquid crystal layer 85 are twisted to the left 90°.

FIG. 31 (3) shows the absorption axis R7 of the polarizer plate 88. FIG. 31 (4) shows the direction of orientation and the direction of twist of the liquid crystal molecules of the liquid crystal layer 79 of the liquid crystal element 72 for color display. The direction of orientation of the liquid crystal molecules nearest the transparent substrate 74b is indicated by the arrow R4, and the direction of orientation of the molecules nearest the transparent substrate 74b is indicated by the arrow R5. Therefore, the liquid crystal molecules of the liquid crystal layer 79 are twisted to the left 90°. FIG. 31 (5) shows the absorption axis R6 of the polarizer plate 87, and this absorption axis R6 is parallel to the direction of orientation R5 of the liquid crystal molecules nearest the transparent substrate 74b.

As shown in FIG. 31, the angle of twist of the liquid crystal molecules in both the liquid crystal layer 79 of the liquid crystal element 72 for color display and the liquid crystal layer 85 of the liquid crystal element 73 for black and white display is 90°. Further, the liquid crystal molecules of both the liquid crystal layers 79 and 85 have levorotatory orientation. Also, the liquid crystal layers 79 and 85 are disposed so that the direction of orientation of the liquid crystal molecules nearest the transparent substrate 74a in the liquid crystal layer 79 and the direction of orientation of the liquid crystal molecules nearest the transparent substrate 81b in the liquid crystal layer 85 are perpendicular to each other. The polarizer plates 87 and 89 are disposed so that they are parallel polarization, and the polarizer plate 88 is disposed so it is perpendicular polarization to the polarizer plates 87 and 89.

Figure 32:
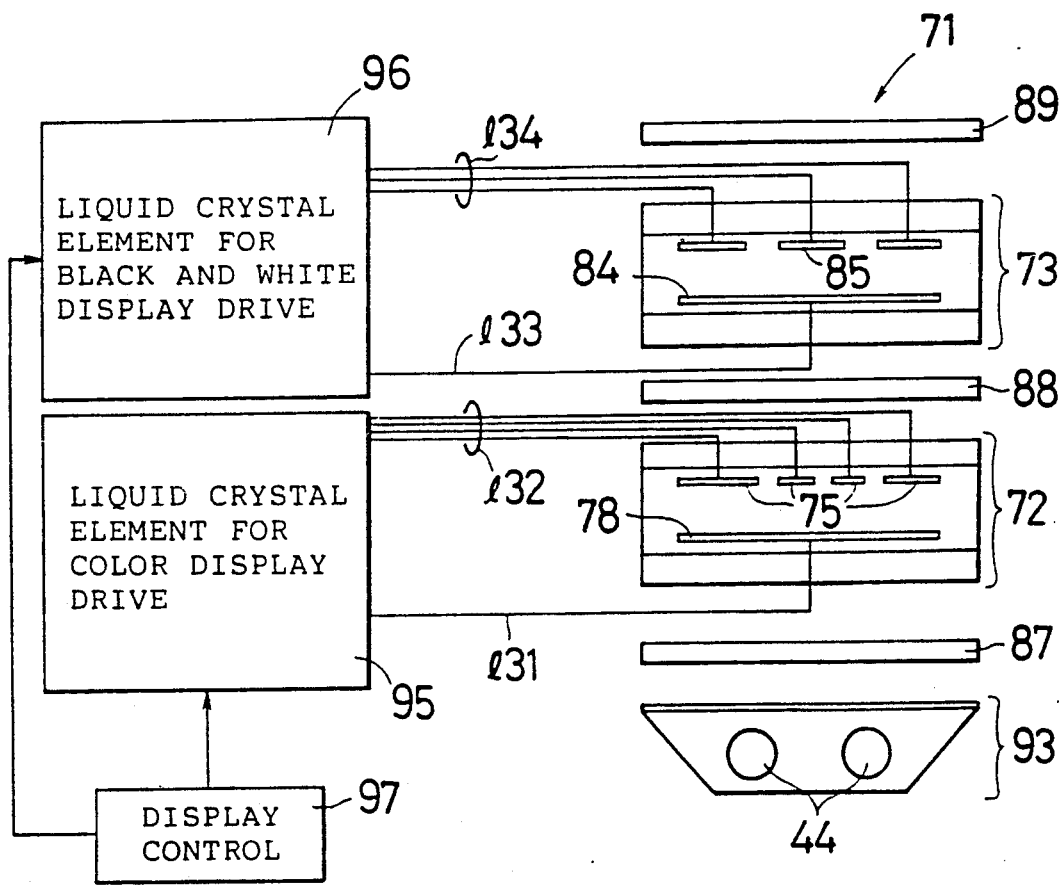
FIG. 32 is a block diagram showing the electrical configuration of the liquid crystal display device 71.

FIG. 32 is a block diagram showing the electrical configuration of the color liquid crystal display device 71. The back light 93 is disposed on the side of the polarizer plate 87 opposite the liquid crystal element 72 for color display, and the light from the back light 93 is passed or blocked by the liquid crystal element 72 for color display and the liquid crystal element 73 for black and white display, whereby color display and black and white display are performed on the color liquid crystal display device 71. The liquid crystal element 72 for color display is controlled by the liquid crystal element drive circuit 95 for color display. The liquid crystal element drive circuit 95 for color display applies voltage on the common electrodes 78 via the signal line 131 and on the selected segment electrodes 75 via the signal line group 132 based on display control signals from the display control circuit 97. By this means, color display can be performed in the liquid crystal elements 72 for color display. The liquid crystal element 73 for black and white display is controlled by the liquid crystal element drive circuit 96 for black and white display. The liquid crystal element drive circuit 96 for black and white display applies voltage on the common electrodes 84 via the signal line 133 and on the selected segment electrodes 82 via the signal line group 134 based on display control signals from the display control circuit 97. By this means, black and white display can be performed in the liquid crystal elements 72 for black and white display.

In the color liquid crystal display device 71 described above, incident light from the back light 93 passes through the polarizer plate 87 and becomes linearly polarized light, and then its direction of polarization is twisted 90° by the liquid crystal element 72 for color display so it passes through the polarizer plate 88 perpendicular to the polarizer plate 87. Next, the linearly polarized light is further twisted 90° by the liquid crystal element 73 for black and white display so it passes through the polarizer plate 89 perpendicular to the polarizer plate 88. Therefore, so-called normally white display is realized on the color liquid crystal display device 71. Normally white display is a display method whereby incident light is passed through the liquid crystal layer when no voltage is applied on the liquid crystal layer so the background color appears white, for example, and voltage is applied on the area of the liquid crystal layer corresponding to the shape to be displayed to change the oriented state of the liquid crystal molecules and block transmitted light, whereby the desired shape is displayed. Here, the color filter layer 76 is composed of the fine, square filters R, G and B as shown in FIG. 19 above, so the transmitted light becomes white light through the mixing of red, green and blue light. That is, white is displayed as the background color in the color liquid crystal display device 71 when voltage is not being applied.

The liquid crystal molecules of the liquid crystal layer 79 on which voltage is applied become oriented along the electrical field. Therefore, the linearly polarized light that passes through the polarizer plate 87 passes through the liquid crystal, layer 79 with its polarized state remaining nearly unchanged. Here, the direction of polarization of the polarizer plate 88 is perpendicular to the direction of polarization of the polarizer plate 87, so the linearly polarized light that passes through the liquid crystal layer 79 cannot pass through the polarizer plate 88.

The liquid crystal layer 79 functions as a light shutter by the operation (on) and non-operation (off) of voltage. TABLE above shows the correlation between the on/off state of the segment electrodes 75, the function of the liquid crystal layer 79 as a light shutter, and the color displayed in the display area.

TABLE 4 below shows the correlation between the driven state of the liquid crystal element 72 for color display and the liquid crystal element 73 for black and white display, the direction of polarization of the incident light on and the light transmitted by the liquid crystal element 72 for color display and the liquid crystal element 73 for black and white display, and the color displayed in each of the display areas of the color liquid crystal display device 71. Here, the direction of polarizer plate 87, 89 is parallel to the surface of the paper in FIG. 29, and the direction of polarizer plate 88 is perpendicular to the surface of the paper in FIG. 29.

TABLE 4

| Display area | Element for color display | | Transmitted light | Element for black & white display | Transmitted light | Transmitted/ blocked | Color |
|---|---|---|---|---|---|---|---|
| A11 | R | OFF | Perpendicular | OFF | Parallel | Transmitted | Red |
|  | G | ON | Parallel |  | x | — |  |
|  | B | ON | Parallel |  | x | — |  |
| A12 | R | OFF | Perpendicular | ON | Perpendicular | Blocked | Black |
|  | G | OFF | Perpendicular |  | Perpendicular | Blocked |  |
|  | B | OFF | Perpendicular |  | Perpendicular | Blocked |  |
| A13 | R | OFF | Perpendicular | ON | Perpendicular | Blocked | Black |
|  | G | ON | Parallel |  | x | — |  |
|  | B | ON | Parallel |  | x | — |  |
| Residual | R | OFF | Perpendicular | OFF | Parallel | Transmitted | White |
|  | G | OFF | Perpendicular |  | Parallel | Transmitted |  |
|  | B | OFF | Perpendicular |  | Parallel | Transmitted |  |

As shown in TABLE 4 above black is displayed in the display area A13 where color display and black and white display overlap. Therefore, the complementary color of the color displayed by color display is not displayed in the area where black and white display and color display overlap as in the prior art (see TABLE 1), thus isolating color display from black and white display and making it possible to distinguish the display image. By this means, the display quality of the color liquid crystal display device 71 is greatly improved.

What is claimed is:

1. A color liquid crystal display device comprising:
   a pair of light-transmission substrates with a liquid crystal layer between them;
   a plurality of color selection members disposed over nearly an entire surface of one of said light-transmissive substrate facing the liquid crystal layer, such color selection members selecting one color for transmitting light from among a plurality of predetermined colors;
   first display electrodes transmissive to light disposed on the side of the one of said light-transmissive substrates toward the liquid crystal layer and corresponding to each of the plurality of color selection members in a predetermined display area; and
   second display electrodes transmissive to light disposed between the one of said light-transmissive substrates and the liquid crystal layer and superposed on said first display electrodes within the predetermined display area so as to form two layer electrodes;
   wherein the amplitude of voltages applied to the liquid crystal layer by the first and second display electrodes is varied by applying voltages on each of the first and second display electrodes in a two layer electrode independently.

2. The color liquid crystal display device in claim 1 wherein the color selection members are square shaped and arranged in a mosaic and the display electrodes corresponding to the color selection members which select the same color are connected in sequence.

* * * * *